United States Patent
Ikai et al.

(10) Patent No.: US 12,532,028 B2
(45) Date of Patent: Jan. 20, 2026

(54) VIDEO DECODING APPARATUS AND VIDEO CODING APPARATUS

(71) Applicant: SHARP KABUSHIKI KAISHA, Sakai (JP)

(72) Inventors: Tomohiro Ikai, Sakai (JP); Tomonori Hashimoto, Sakai (JP); Tomoko Aono, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/720,612

(22) PCT Filed: Nov. 28, 2022

(86) PCT No.: PCT/JP2022/043680
§ 371 (c)(1),
(2) Date: Jun. 14, 2024

(87) PCT Pub. No.: WO2023/112648
PCT Pub. Date: Jun. 22, 2023

(65) Prior Publication Data
US 2025/0056047 A1    Feb. 13, 2025

(30) Foreign Application Priority Data

Dec. 14, 2021 (JP) .................. 2021-202155

(51) Int. Cl.
*H04N 19/61* (2014.01)
(52) U.S. Cl.
CPC .................... *H04N 19/61* (2014.11)
(58) Field of Classification Search
CPC ....................................... H04N 19/61
USPC ................................... 375/240.18
See application file for complete search history.

(56) References Cited

FOREIGN PATENT DOCUMENTS

| | | |
|---|---|---|
| JP | 2021-034887 A | 3/2021 |
| WO | 2022/254899 A1 | 12/2022 |

OTHER PUBLICATIONS

JP2021-034887 Machine Translation (Year: 2021).*
"Infrastructure of audiovisual services—Coding of moving video", ITU-T H.266 (V3) (Sep. 2023), International Telecommunication Union, Standardization Sector.

* cited by examiner

*Primary Examiner* — Nguyen T Truong
(74) *Attorney, Agent, or Firm* — ScienBiziP, P.C.

(57) ABSTRACT

A video coding/decoding apparatus that can enhance coding efficiency using non-separable transform is provided. A video decoding apparatus according to an aspect of the present invention includes a prediction image generation unit configured to generate a prediction image, and an inverse non-separable transform processing unit configured to perform inverse non-separable transform. The non-separable transform processing unit does not change a specific frequency component of a transform coefficient.

4 Claims, 23 Drawing Sheets

| | Descriptor |
|---|---|
| merge_data( x0, y0, cbWidth, cbHeight, chType ) { | |
|   if( CuPredMode[ chType ][ x0 ][ y0 ] == MODE_IBC ) { | |
|     if( MaxNumIbcMergeCand > 1 ) | |
|       merge_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] == 1 ) { | |
|       if( MaxNumSubblockMergeCand > 1 ) | |
|         merge_subblock_idx[ x0 ][ y0 ] | ae(v) |
|     } else { | |
|       if( cbWidth < 128 && cbHeight < 128 &&<br>        ( ( sps_ciip_enabled_flag && cu_skip_flag[ x0 ][ y0 ] == 0 &&<br>          ( cbWidth * cbHeight ) >= 64 ) \|\|<br>        ( sps_gpm_enabled_flag &&<br>          sh_slice_type == B && cbWidth >= 8 && cbHeight >= 8 &&<br>          cbWidth < ( 8 * cbHeight ) && cbHeight < ( 8 * cbWidth ) ) ) ) | |
|       regular_merge_flag[ x0 ][ y0 ] | ae(v) |
|       if( regular_merge_flag[ x0 ][ y0 ] == 1 ) { | |
|         if( sps_mmvd_enabled_flag ) | |
|           mmvd_merge_flag[ x0 ][ y0 ] | ae(v) |
|         if( mmvd_merge_flag[ x0 ][ y0 ] == 1 ) { | |
|           if( MaxNumMergeCand > 1 ) | |
|             mmvd_cand_flag[ x0 ][ y0 ] | ae(v) |
|           mmvd_distance_idx[ x0 ][ y0 ] | ae(v) |
|           mmvd_direction_idx[ x0 ][ y0 ] | ae(v) |
|         } else if( MaxNumMergeCand > 1 ) | |
|           merge_idx[ x0 ][ y0 ] | ae(v) |
|       } else { | |
|         if( sps_ciip_enabled_flag && sps_gpm_enabled_flag &&<br>          sh_slice_type == B &&<br>          cu_skip_flag[ x0 ][ y0 ] == 0 && cbWidth >= 8 && cbHeight >= 8 &&<br>          cbWidth < ( 8 * cbHeight ) && cbHeight < ( 8 * cbWidth ) &&<br>          cbWidth < 128 && cbHeight < 128 ) | |
|           ciip_flag[ x0 ][ y0 ] | ae(v) |
|         if( ciip_flag[ x0 ][ y0 ] && MaxNumMergeCand > 1 ) | |
|           merge_idx[ x0 ][ y0 ] | ae(v) |
|         if( !ciip_flag[ x0 ][ y0 ] ) { | |
|           merge_gpm_partition_idx[ x0 ][ y0 ] | ae(v) |
|           merge_gpm_idx0[ x0 ][ y0 ] | ae(v) |
|           if( MaxNumGpmMergeCand > 2 ) | |
|             merge_gpm_idx1[ x0 ][ y0 ] | ae(v) |
|   ... | |
| } | |

FIG. 7

(a)
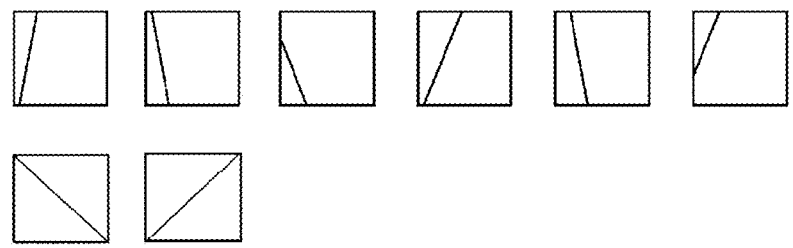
(b)
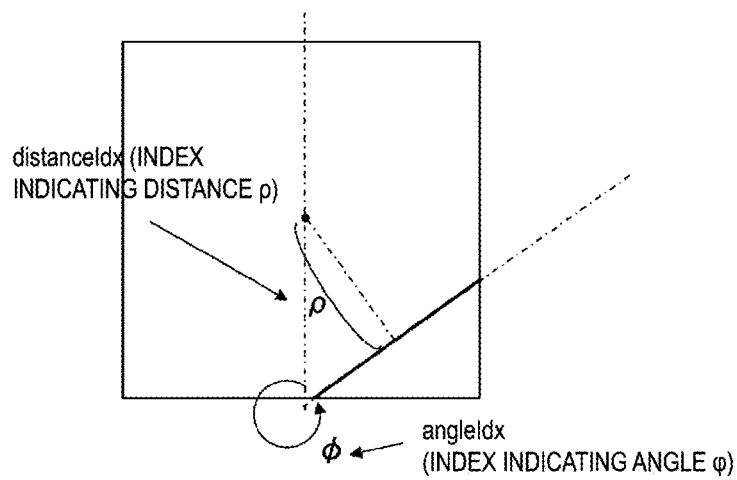
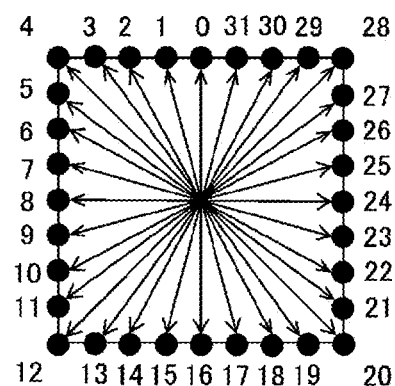
FIG. 8

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |
| merge_gpm_partition_idx | 16 | 17 | 18 | 19 | 20 | 21 | 22 | 23 | 24 | 25 | 26 | 27 | 28 | 29 | 30 | 31 |
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |
| merge_gpm_partition_idx | 32 | 33 | 34 | 35 | 36 | 37 | 38 | 39 | 40 | 41 | 42 | 43 | 44 | 45 | 46 | 47 |
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |
| merge_gpm_partition_idx | 48 | 49 | 50 | 51 | 52 | 53 | 54 | 55 | 56 | 57 | 58 | 59 | 60 | 61 | 62 | 63 |
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

(b)

| idx | 0 | 2 | 3 | 4 | 5 | 6 | 8 | 10 | 11 | 12 | 13 | 14 |
|---|---|---|---|---|---|---|---|---|---|---|---|---|
| disLut[idx] | 8 | 8 | 8 | 4 | 4 | 2 | 0 | -2 | -4 | -4 | -8 | -8 |
| idx | 16 | 18 | 19 | 20 | 21 | 22 | 24 | 26 | 27 | 28 | 29 | 30 |
| disLut[idx] | -8 | -8 | -8 | -4 | -4 | -2 | 0 | 2 | 4 | 4 | 8 | 8 |

FIG. 9

| | Descriptor |
|---|---|
| coding_unit( x0, y0, cbWidth, cbHeight, cqtDepth, treeType, modeType ) { | |
| | |
|   if( CuPredMode[ chType ][ x0 ][ y0 ] != MODE_INTRA && !pred_mode_plt_flag && <br>     general_merge_flag[ x0 ][ y0 ] == 0 ) | |
|     cu_coded_flag | ae(v) |
|   if( cu_coded_flag ) { | |
|     if( CuPredMode[ chType ][ x0 ][ y0 ] == MODE_INTER && sps_sbt_enabled_flag && <br>       !ciip_flag[ x0 ][ y0 ] && cbWidth <= MaxTbSizeY && cbHeight <= MaxTbSizeY ) { | |
|     LfnstDcOnly = 1 | |
|     LfnstZeroOutSigCoeffFlag = 1 | |
|     MtsDcOnly = 1 | |
|     MtsZeroOutSigCoeffFlag = 1 | |
|     transform_tree( x0, y0, cbWidth, cbHeight, treeType, chType ) | |
|     lfnstWidth = ( treeType == DUAL_TREE_CHROMA ) ? cbWidth / SubWidthC : <br>       ( ( IntraSubPartitionsSplitType == ISP_VER_SPLIT ) ? <br>         cbWidth / NumIntraSubPartitions : cbWidth ) | |
|     lfnstHeight = ( treeType == DUAL_TREE_CHROMA ) ? cbHeight / SubHeightC : <br>       ( ( IntraSubPartitionsSplitType == ISP_HOR_SPLIT) ? <br>         cbHeight / NumIntraSubPartitions : cbHeight ) | |
|     lfnstNotTsFlag = ( treeType == DUAL_TREE_CHROMA \|\| <br>       !tu_y_coded_flag[ x0 ][ y0 ] \|\| transform_skip_flag[ x0 ][ y0 ][ 0 ] == 0 ) && <br>       ( treeType == DUAL_TREE_LUMA \|\| <br>       ( ( !tu_cb_coded_flag[ x0 ][ y0 ] \|\| <br>       transform_skip_flag[ x0 ][ y0 ][ 1 ] == 0 ) && <br>       ( !tu_cr_coded_flag[ x0 ][ y0 ] \|\| transform_skip_flag[ x0 ][ y0 ][ 2 ] == 0 ) ) ) | |
|     if( Min( lfnstWidth, lfnstHeight ) >= 4 &&    ← SYN_INTRA_LFNST <br> sps_lfnst_enabled_flag==1 &&(CuPredMode[ chType ][ x0 ][ y0 ]==MODE_INTRA ) \|\| <br> (MergeGpmFlag==1 \|\| ciip_flag )  ← SYN_GPM_CIIP_LFNST <br> && lfnstNotTsFlag == 1 && <br>     ( treeType == DUAL_TREE_CHROMA \|\| !intra_mip_flag[ x0 ][ y0 ] \|\| <br>       Min( lfnstWidth, lfnstHeight ) >= 16 )  && Max( cbWidth, cbHeight ) <= MaxTbSizeY) <br> { | |
|       if( ( IntraSubPartitionsSplitType != ISP_NO_SPLIT \|\| LfnstDcOnly == 0 ) && <br>         LfnstZeroOutSigCoeffFlag == 1 ) | |
|       lfnst_idx | ae(v) |
|     } | |
|     if( treeType != DUAL_TREE_CHROMA && lfnst_idx == 0 && <br>       transform_skip_flag[ x0 ][ y0 ][ 0 ] == 0 && Max( cbWidth, cbHeight ) <= 32 && <br>       IntraSubPartitionsSplitType == ISP_NO_SPLIT && cu_sbt_flag == 0 && <br>       MtsZeroOutSigCoeffFlag == 1 && MtsDcOnly == 0 ) { | |
|       if( ( ( CuPredMode[ chType ][ x0 ][ y0 ] == MODE_INTER && <br>       sps_explicit_mts_inter_enabled_flag ) \|\| <br>       ( CuPredMode[ chType ][ x0 ][ y0 ] == MODE_INTRA && <br>       sps_explicit_mts_intra_enabled_flag ) ) ) | |
|       mts_idx | ae(v) |
|     } | |
|   } | |
| } | |

FIG. 12

| transform_unit( x0, y0, tbWidth, tbHeight, treeType, subTuIndex, chType ) { | Descriptor |
|---|---|
|   if( IntraSubPartitionsSplitType != ISP_NO_SPLIT && <br>     treeType == SINGLE_TREE && subTuIndex == NumIntraSubPartitions − 1 ) <br>   { | |
|   ... | |
|   if( tu_y_coded_flag[ x0 ][ y0 ] && treeType != DUAL_TREE_CHROMA ) { | |
|     if( sps_transform_skip_enabled_flag && !BdpcmFlag[ x0 ][ y0 ][ 0 ] && tbWidth <= MaxTsSize && tbHeight <= MaxTsSize && ( IntraSubPartitionsSplitType == ISP_NO_SPLIT ) && !cu_sbt_flag ) | |
|       transform_skip_flag[ x0 ][ y0 ][ 0 ] | ae(v) |
|     if( !transform_skip_flag[ x0 ][ y0 ][ 0 ] || slice_ts_residual_coding_disabled_flag ) | |
|       residual_coding( x0, y0, Log2( tbWidth ), Log2( tbHeight ), 0 ) | |
|     else | |
|       residual_ts_coding( x0, y0, Log2( tbWidth ), Log2( tbHeight ), 0 ) | |
|   } | |
|   lfnstWidth = tbWidth | |
|   lfnstHeight = tbHeight | |
|   if(treeType != DUAL_TREE_CHROMA ) {      ← SYN_INTRA_LFNST | |
|     if( Min( lfnstWidth, lfnstHeight ) >= 4 && <br> sps_lfnst_enabled_flag==1 && (CuPredMode[ chType ][ x0 ][ y0 ]==MODE_INTRA ) || <br> (MergeGpmFlag==1 || ciip_flag )&&      ← SYN_GPM_CIIP_LFNST <br>       transform_skip_flag[ x0 ][ y0 ][ 0 ] == 0 && <br>       ( !intra_mip_flag[ x0 ][ y0 ] || <br>       Min( lfnstWidth, lfnstHeight ) >= 16 ) && <br>       Max(CbWidth[ chType ][ x0 ][ y0 ], CbHeight[ chType ][ x0 ][ y0 ] ) <= <br> MaxTbSizeY) && (IntraSubPartitionsSplitType==ISP_NO_SPLIT || ISPTuFlag==0) { | |
|       if( ( IntraSubPartitionsSplitType!=ISP_NO_SPLIT || LfnstDcOnly ==0 ) && <br>         LfnstZeroOutSigCoeffFlag==1 ) | |
|       lfnst_idx | ae(v) |
|     } | |
|     if( lfnst_idx == 0 && <br>       transform_skip_flag[ x0 ][ y0 ][ 0 ] == 0 && <br> Max(CbWidth[ chType ][ x0 ][ y0 ], CbHeight[ chType ][ x0 ][ y0 ]) <= 32 && <br> IntraSubPartitionsSplitType == ISP_NO_SPLIT && cu_sbt_flag == 0 && <br>       MtsZeroOutSigCoeffFlag == 1 && MtsDcOnly == 0 ) { | |
|       if( ( ( CuPredMode[ chType ][ x0 ][ y0 ] == MODE_INTER && <br> sps_explicit_mts_inter_enabled_flag ) || <br>         ( CuPredMode[ chType ][ x0 ][ y0 ] == MODE_INTRA && <br> sps_explicit_mts_intra_enabled_flag ) ) ) | |
|       mts_idx | ae(v) |
|     } | |
|   } | |
|   ... | |
| } | |

FIG. 13

| predModeIntra | lfnstTrSetIdx |
|---|---|
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |

FIG. 14

EXAMPLE OF TRANSFORM MATRIX THAT DOES NOT CHANGE SPECIFIC FREQUENCY (HERE, DC COMPONENT)

VIDEO DECODING APPARATUS AND VIDEO CODING APPARATUS

TECHNICAL FIELD

An embodiment of the present invention relates to a video decoding apparatus and a video coding apparatus. This application claims priority based on JP 2021-202155 filed in Japan on Dec. 14, 2021, the contents of which are incorporated herein by reference.

BACKGROUND ART

A video coding apparatus which generates coded data by coding a video, and a video decoding apparatus which generates decoded images by decoding coded data are used for efficient transmission or recording of videos.

Specific video coding schemes include, for example, H.264/AVC and High-Efficiency Video Coding (HEVC), and the like.

In such a video coding scheme, images (pictures) constituting a video are managed in a hierarchical structure including slices obtained by splitting an image, Coding Tree Units (CTUs) obtained by splitting a slice, Coding Units (CUs) obtained by splitting a coding tree unit, and Transform Units (TUs) obtained by splitting a coding unit, and are coded/decoded for each CU.

In such a video coding scheme, usually, a prediction image is generated based on a locally decoded image that is obtained by coding/decoding an input image, and a prediction error (which may be referred to also as a "difference image" or a "residual image") obtained by subtracting the prediction image from the input image (source image) is coded. Generation methods of prediction images include inter picture prediction (inter prediction) and intra picture prediction (intra prediction).

In addition, NPL 1 discloses a Geometric partition mode (GPM) mode in which a target block is split in a shape other than rectangles and different inter prediction is performed for each region. By splitting a target block in a shape other than rectangles in this way, even a complex texture can be predicted more accurately, and coding efficiency is improved. In addition, NPL 1 discloses an image encoding apparatus that performs a non-separable transform for each transform unit in order to further concentrate coefficients obtained by performing a separable transform on prediction errors in a low frequency region.

CITATION LIST

Non Patent Literature

NPL 1: ITU-T Rec. H.266

SUMMARY OF INVENTION

Technical Problem

In NPL 1, there is a problem in that a non-separable transform technique effective for directional prediction residuals is applied only to intra prediction blocks having a high correlation with neighboring pixels in which luminance change does not easily occur and are not adapted to inter prediction blocks in which luminance change easily occurs. An aspect of the present invention has an object to provide a video decoding apparatus and a video coding apparatus that can preferably apply inverse non-separable transform even in a case that there is luminance change.

Solution to Problem

In order to solve the problem described above, a video decoding apparatus according to an aspect of the present invention includes a prediction image generation unit configured to generate a prediction image, and an inverse non-separable transform processing unit configured to perform inverse non-separable transform. The non-separable transform processing unit does not change a specific frequency component of a transform coefficient.

The inverse non-separable transform processing unit may not change a DC component being a top left component.

The inverse non-separable transform processing unit may not change the DC component being the top left component in a case of inter prediction.

The inverse non-separable transform processing unit may derive a one-dimensional array excluding the DC component, and perform transform of the one-dimensional array.

The inverse non-separable transform processing unit may use a transform matrix in which a left edge component and a top edge component, except a top left component, are zeros.

A video decoding apparatus includes a prediction image generation unit configured to generate a prediction image, and an inverse non-separable transform processing unit configured to perform inverse non-separable transform. The non-separable transform processing unit does not change a specific frequency component of a transform coefficient.

A video decoding apparatus is configured to, in a case of deriving a prediction image using a weighted sum of an intra prediction image and an inter prediction image select a transform matrix of non-separable transform and perform the non-separable transform by using an intra prediction mode used for derivation of the intra prediction image.

In the video decoding apparatus, a mode that uses the prediction image may be a CIP mode that derives the weight depending on a state of a neighboring block.

In the video decoding apparatus, a mode that uses the prediction image may be a geometry mode that derives a weight according to a parameter derived from coded data.

A video coding apparatus is configured to, in a case of deriving a prediction image using a weighted sum of an intra prediction image and an inter prediction image, select a transform matrix of non-separable transform and perform the non-separable transform by using an intra prediction mode used for derivation of the intra prediction image.

Advantageous Effects of Invention

According to an aspect of the present invention, in video coding/decoding processing, coding efficiency can be enhanced by performing suitable non-separable transform in inter prediction.

BRIEF DESCRIPTION OF DRAWINGS

FIG. 7 is a syntax diagram illustrating coding parameters of GPM prediction.

FIG. 8 is a diagram illustrating the GPM prediction.

FIG. 9 is a diagram illustrating a structure of a table illustrating a correspondence between merge_gpm_partition_idx, angleIdx, and distanceIdx in the GPM prediction. It is a diagram illustrating a structure of a table illustrating a correspondence between idx and DisLut[idx] used in weight coefficient derivation processing and motion vector storing processing in the GPM prediction.

FIG. 12 is an example of a syntax table illustrating flags of non-separable transform.

FIG. 13 is an example of a syntax table illustrating flags of non-separable transform.

FIG. 14 is a table used for transform matrix selection of the non-separable transform in the intra prediction mode.

FIG. 18 is a diagram illustrating transform (non-separable transform) of storing DC transform.

DESCRIPTION OF EMBODIMENTS

First Embodiment

Embodiments of the present invention will be described below with reference to the drawings.

Figure 1:
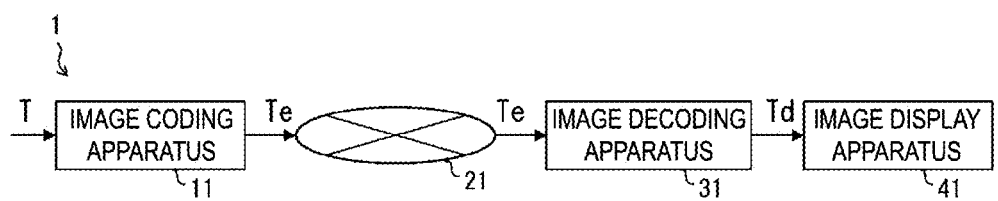
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system in which a coding stream obtained by coding a target image is transmitted, the transmitted coding stream is decoded, and thus an image is displayed. The image transmission system 1 includes a video coding apparatus (image coding apparatus) 11, a network 21, a video decoding apparatus (image decoding apparatus) 31, and a video display apparatus (image display apparatus) 41.

An image T is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not limited to a bidirectional communication network and may be a unidirectional communication network that transmits broadcast waves for terrestrial digital broadcasting, satellite broadcasting, or the like. The network 21 may be substituted by a storage medium in which the coding stream Te is recorded, such as a Digital Versatile Disc (DVD) (trade name) or a Blue-ray Disc (BD) (trade name).

The video decoding apparatus 31 decodes each of the coding streams Te transmitted from the network 21 and generates one or multiple decoded images Td.

The video display apparatus 41 displays all or part of one or multiple decoded images Td generated by the video decoding apparatus 31. For example, the video display apparatus 41 includes a display device such as a liquid crystal display and an organic Electro-luminescence (EL) display. Examples of display types include stationary, mobile, and HMD. In addition, in a case that the video decoding apparatus 31 has a high processing capability, an image having high image quality is displayed, and in a case that the video decoding apparatus has a lower processing capability, an image which does not require high processing capability and display capability is displayed.

Operators

Operators used in the present specification will be described below.

">>" is a right bit shift, "<<" is a left bit shift, "&" is a bitwise AND, "|" is a bitwise OR, is an OR assignment operator, and "||" indicates a logical sum.

x?y:z is a ternary operator that takes y in a case that x is true (other than 0) and takes z in a case that x is false (0).

Clip3(a, b, c) is a function to clip c in a value from a to b, and a function to return a in a case that c is smaller than a (c<a), return b in a case that c is greater than b (c>b), and return c in the other cases (provided that a is smaller than or equal to b (a<=b)).

abs(a) is a function that returns the absolute value of a.

Int(a) is a function that returns the integer value of a.

floor(a) is a function that returns the maximum integer equal to or smaller than a.

ceil(a) is a function that returns the minimum integer equal to or greater than a.

a/d represents division of a by d (round down decimal places).

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 2:
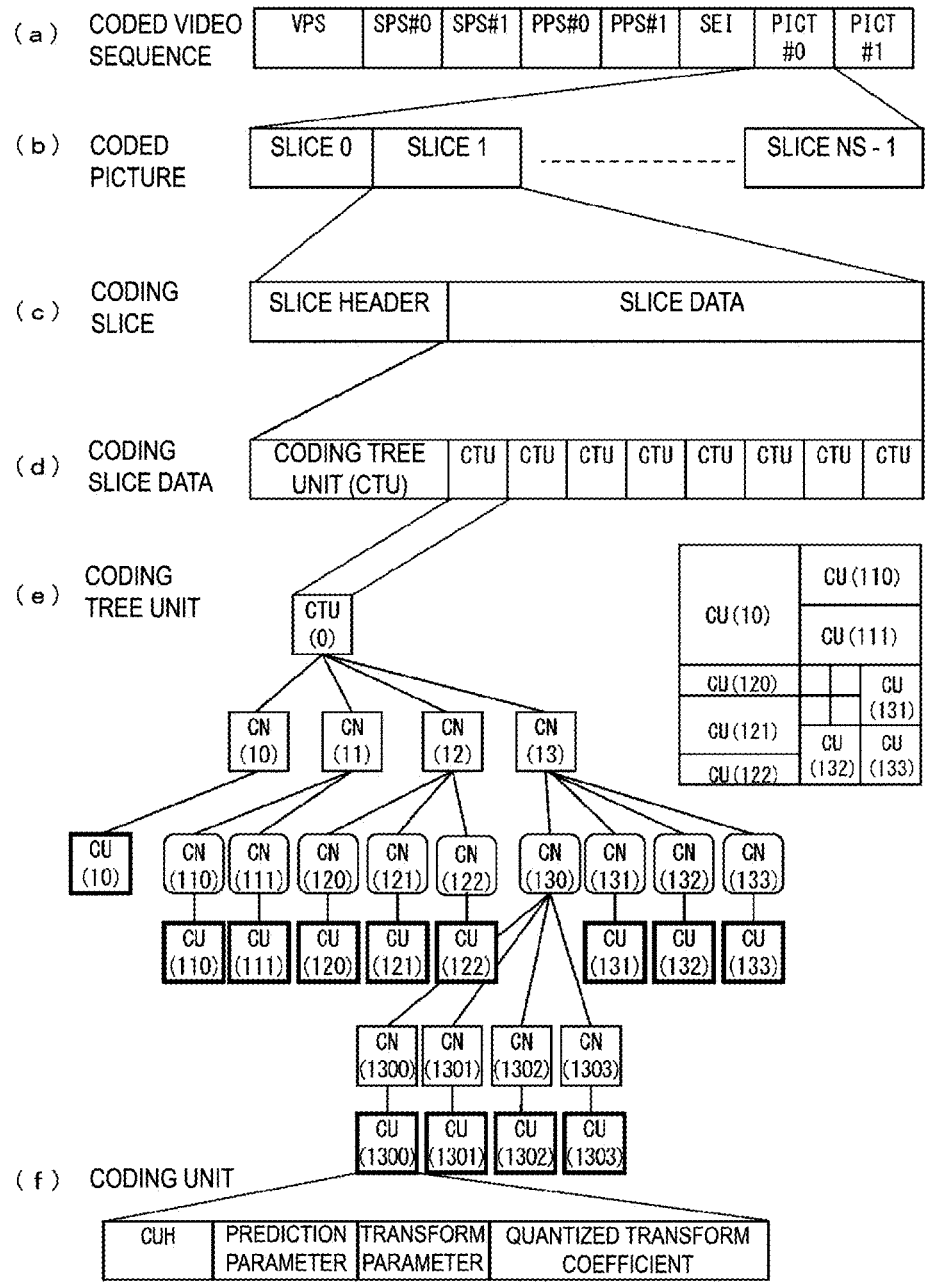
FIG. 2 is a diagram illustrating a hierarchical structure of data of a coding stream.

FIG. 2 is a diagram illustrating a hierarchical structure of data of the coding stream Te. The coding stream Te includes, as an example, a sequence and multiple pictures constituting the sequence. (a) to (f) of FIG. 2 are diagrams illustrating a coded video sequence predefining a sequence SEQ, a coded picture defining a picture PICT, a coding slice defining a slice S, a coding slice data defining slice data, a coding tree unit included in the coding slice data, and a coding unit included in the coding tree unit, respectively.

Coded Video Sequence

In the coded video sequence, a set of data referred to by the video decoding apparatus 31 to decode a sequence SEQ to be processed is defined. As illustrated in FIG. 2, the sequence SEQ includes a Video Parameter Set, Sequence Parameter Sets SPS, Picture Parameter Sets PPS, an Adaptation Parameter Set (APS), a picture PICT, and Supplemental Enhancement Information SEI.

The video parameter set VPS defines, in a video including multiple layers, a set of coding parameters common to multiple video images and a set of coding parameters relating to multiple layers and individual layers included in the video.

In the sequence parameter sets SPSs, a set of coding parameters referred to by the video decoding apparatus 31 to decode a target sequence is defined. For example, a width and a height of a picture are defined. Note that multiple SPSs may exist. In that case, any of the multiple SPSs is selected from the PPS.

In the picture parameter sets (PPS), a set of coding parameters that the video decoding apparatus 31 refers to in order to decode each picture in the target sequence is defined. For example, a PPS includes a reference value for a quantization step size used in picture decoding (pic_init_qp_minus26) and a flag indicating application of weighted prediction (weighted_pred_flag). Note that multiple PPSs may exist. In that case, any of the multiple PPSs is selected from each picture in a target sequence.

Coded Picture

In the coded picture, a set of data referred to by the video decoding apparatus 31 to decode a picture PICT to be processed is defined. The picture PICT includes slice 0 to slice NS−1 (NS is the total number of slices included in the picture PICT) as illustrated in FIG. 2.

Note that, in a case that it is not necessary to distinguish each of the slice 0 to the slice NS−1 below, numeric suffixes of reference signs may be omitted. In addition, the same applies to other data with suffixes included in the coding stream Te which will be described below.

Coding Slice

In each coding slice, a set of data referred to by the video decoding apparatus 31 to decode a slice S to be processed is defined. The slice includes a slice header and slice data as illustrated in FIG. 2.

The slice header includes a coding parameter group referred to by the video decoding apparatus 31 to determine a decoding method for a target slice. Slice type indication information (slice_type) indicating a slice type is one example of a coding parameter included in the slice header.

Examples of slice types that can be indicated by the slice type indication information include (1) an I slice for which only intra prediction is used for coding, (2) a P slice for which unidirectional prediction or intra prediction is used for coding, (3) a B slice for which unidirectional prediction, bidirectional prediction, or intra prediction is used for coding. Note that the inter prediction is not limited to uni-prediction and bi-prediction, and a prediction image may be generated by using a larger number of reference pictures. Hereinafter, in a case of a slice being referred to as a P or B slice, it indicates a slice including a block in which inter prediction can be used.

Note that the slice header may include a reference to the picture parameter set PPS (pic_parameter_set_id).

Coding Slice Data

In coding slice data, a set of data referred to by the video decoding apparatus 31 to decode slice data to be processed is defined. The slice data includes CTUs as illustrated in FIG. 2(d). A CTU is a block in a fixed size (for example, 64×64) constituting a slice, and may also be called a Largest Coding Unit (LCU).

Coding Tree Unit

In FIG. 2, a set of data referenced by the video decoding apparatus 31 to decode a CTU to be processed is defined. The CTU is split into coding units CUs, each of which is a basic unit of coding processing, by a recursive Quad Tree (QT) split, Binary Tree (BT) split, or Ternary Tree (TT) split. The BT split and the TT split are collectively referred to as Multi Tree (MT) split. A node of a tree structure obtained by recursive quad tree split is referred to as a Coding Node. An intermediate node of a quad tree, a binary tree, and a ternary tree is a coding node, and a CTU itself is also defined as the highest coding node. The lowest coding node is defined as the coding unit.

Coding Unit

In FIG. 2, a set of data referenced by the video decoding apparatus 31 to decode a coding unit to be processed is defined. Specifically, a CU includes a CU header CUH, a prediction parameter, a transform parameter, a quantized transform coefficient, and the like. In the CU header, a prediction mode and the like are defined.

The prediction processing may be performed on a CU basis or performed on a sub-CU basis, the sub-CU being obtained by further splitting the CU. In a case that a CU and a sub-CU have an equal size, the number of sub-CUs in the CU is one. In a case that a CU has a size larger than that of a sub-CU, the CU is split into sub-CUs. For example, in a case that a CU has a size of 8×8, and a sub-CU has a size of 4×4, the CU is split into four sub-CUs which include two horizontal splits and two vertical splits.

Types of prediction (prediction mode) include intra prediction (MODE_INTRA), inter prediction (MODE_INTER), and an intra block copy (MODE_IBC). Intra prediction refers to prediction in the same picture, and inter prediction refers to prediction processing performed between different pictures (for example, between pictures of different display times, and between pictures of different layer images).

Although transform and quantization processing is performed on a CU basis, entropy coding of a quantized transform coefficient may be performed on a per subblock basis such as 4×4.

Prediction Parameters

A prediction image is derived by prediction parameters associated with blocks. The prediction parameters include intra prediction and inter prediction parameters.

Prediction Parameters for Inter Prediction

The prediction parameters for inter prediction will be described. Inter prediction parameters include prediction list utilization flags predFlagL0 and predFlagL1, reference picture indices refIdxL0 and refIdxL1, and motion vectors mvL0 and mvL1. predFlagL0 and predFlagL1 are flags indicating whether reference picture lists (L0 list and L1 list) are used, and in a case that the value of each of the flags is 1, a corresponding reference picture list is used. Note that, in a case that the present specification mentions "a flag indicating whether XX is applied", the flag indicating a value other than 0 (for example, 1) means a case where XX is applied, and the flag indicating 0 means a case where XX is not applied, and 1 is treated as true and 0 is treated as false in a logical negation, a logical product, and the like (hereinafter, the same applies). However, other values can be used for true values and false values in real apparatuses and methods.

Syntax elements for deriving the inter prediction parameters include, for example, a merge flag merge_flag (general_merge_flag), a merge index merge_idx, merge_subblock flag indicating whether to use inter prediction in units of subblock, regulare_merge_flag, an intra inter flag ciip_flag, GPM flag (hereinafter also referred to as MergeGpmFlag) indicating whether to use a Geometric partitioning merge mode (GPM mode), merge_gpm_partition_idx indicating a split shape of the GPM mode, merge_gpm_idx0 and merge_gpm_idx1 indicating the merge indexes of the GPM, an inter prediction indicator inter_pred_idc for selecting a reference picture to be used in an AMVP mode, a reference picture index refIdxLX, a prediction vector index mvp_LX_idx for deriving a motion vector, a difference vector mvdLX, a motion vector resolution mode amvr_mode, and ciip_flag indicating a CIP mode (Combined intra inter prediction).

Reference Picture List

A reference picture list is a list including reference pictures stored in a reference picture memory 306. For individual CUs, which picture in a reference picture list RefPicListX (X=0 or 1) is actually referred to is indicated with refIdxLX. Note that LX is a description method used in a case of not distinguishing L0 prediction and L1 prediction, and in the following description, distinguishes parameters for the L0 list and parameters for the L1 list by replacing LX with L0 and L1.

Merge Prediction and AMVP Prediction

A decoding (coding) method for prediction parameters includes a merge prediction (merge) mode (merge mode) and an Advanced Motion Vector Prediction (AMVP) mode, and merge flag is a flag for identifying the modes. The merge mode is a prediction mode in which some or all of motion vector differences are omitted, and a prediction list utilization flag predFlagLX, reference picture index refIdxLX, and a motion vector mvLX are derived from prediction parameters for neighboring blocks already processed, or the like, without being included in coded data. The AMVP mode is a mode in which inter_pred_idc, refIdxLX, and mvLX are included in the coded data. Note that mvLX is coded as mvp_LX_idx identifying a prediction vector mvpLX and a difference vector mvdLX. In addition, the prediction mode in which the motion vector difference is omitted or simplified is collectively called a general merge mode, and the general merge mode and the AMVP prediction may be selected by general_merge_flag. Furthermore, in a case that regular_merge_flag is transmitted, and regular_merge_flag is 1, the normal merge mode or the MMVD may be selected, and otherwise the CIP mode or the GPM mode may be selected.

inter_pred_idc is a value indicating the types and number of reference pictures, and takes any value of PRED_L0, PRED_L1, or PRED_BI. PRED_L0 and PRED_L1 indicate uni-prediction which uses one reference picture managed in the L0 list and one reference picture managed in the L1 list, respectively. PRED_BI indicates bi-prediction which uses two reference pictures managed in the L0 list and the L1 list.

merge_idx is an index indicating which prediction parameter is used as a prediction parameter for a target block, among prediction parameter candidates (merge candidates) derived from process-completed blocks.

Motion Vector mvLX indicates a shift amount between blocks in two different pictures. A prediction vector and a difference vector related to mvLX are referred to as mvpLX and mvdLX, respectively.

Inter Prediction Indicator inter_pred_idc and Prediction List Utilization Flag predFlagLX Relationships between inter_pred_idc and predFlagL0 and predFlagL1 are as follows, and can be transformed into one another.

$$\text{inter\_pred\_idc} = (predFlagL1 << 1) + predFlagL0$$
$$predFlagL0 = \text{inter\_pred\_idc} \,\&\, 1$$
$$predFlagL1 = \text{inter\_pred\_idc} >> 1$$

Note that the inter prediction parameters may use a prediction list utilization flag or may use an inter prediction indicator. In addition, determination using a prediction list utilization flag may be replaced with determination using an inter prediction indicator. On the contrary, determination using an inter prediction indicator may be replaced with determination using a prediction list utilization flag.

Determination of Bi-Prediction biPred

A flag biPred for identifying a bi-prediction can be derived from whether two prediction list utilization flags are both 1.

Alternatively, biPred can be also derived from whether the inter prediction indicator is a value indicating the use of two prediction lists (reference pictures).

Configuration of Video Decoding Apparatus

Figure 3:
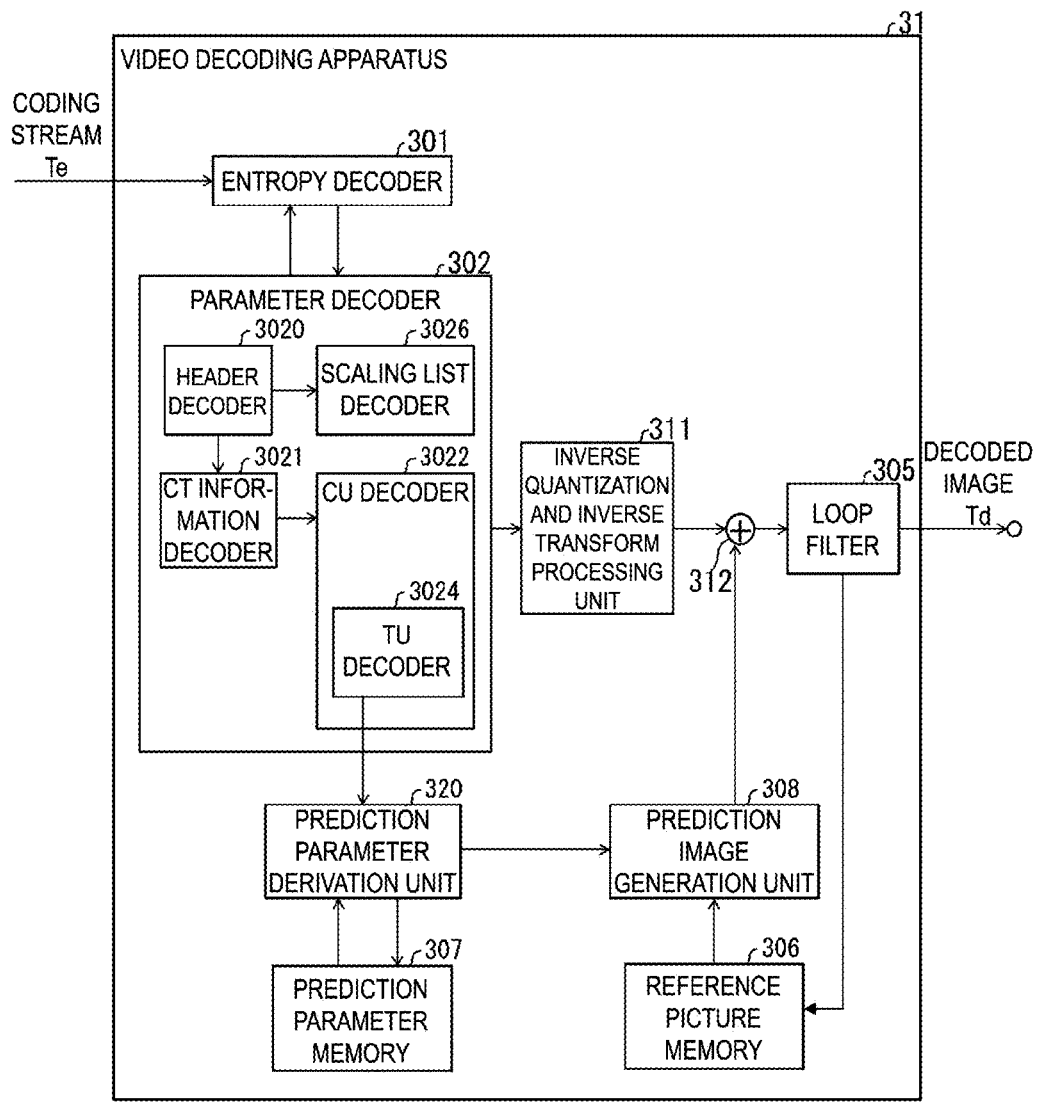
FIG. 3 is a schematic diagram illustrating a configuration of a video decoding apparatus.

A configuration of the video decoding apparatus 31 (FIG. 3) according to the present embodiment will be described.

The video decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, an addition unit 312, and a prediction parameter derivation unit 320. Note that a configuration in which the loop filter 305 is not included in the video decoding apparatus 31 may be used in accordance with the video coding apparatus 11 described below.

The parameter decoder 302 further includes a header decoder 3020, a CT information decoder 3021, and a CU decoder 3022 (prediction mode decoder), and the CU decoder 3022 further includes a TU decoder 3024. These may be collectively referred to as a decoding module. The header decoder 3020 decodes, from coded data, parameter set information such as a VPS, an SPS, a PPS, and an APS, and a slice header (slice information). The CT information decoder 3021 decodes a CT from coded data. The CU decoder 3022 decodes a CU from coded data. In a case that a TU includes a prediction error, the TU decoder 3024 decodes QP update information (quantization correction value) and a quantization prediction error (residual_coding) from coded data.

The header decoder 3020 decodes a flag sps_lfnst_enabled_flag indicating whether to use non-separable transform from the SPS. In addition, in a case that sps_lfnst_enabled_flag is 1, the header decoder 3020 decodes ph_lfnst_enabled_flag from a picture header (PH). In a case that ph_lfnst_enabled_flag does not appear, ph_lfnst_enabled_flag is inferred to be zero (0). Alternatively, in a case that ph_lfnst_enabled_flag does not appear, a value of ph_lfnst_enabled_flag may be set equal to a value of sps_lfnst_enabled_flag.

GPM non-separable transform according to an aspect of the present invention is a term for inverse non-separable transform (and non-separable transform) in a case that the inter prediction is for the GPM mode. The following will describe a method of deriving a transform matrix or a set of transform matrices of the non-separable transform from the split shape of the GPM.

sps_gpm_enabled_flag is signaled by the SPS and indicates whether the GPM prediction mode is used in the target sequence. In the SPS, sps_max_num_merge_cand_minus_max_num_gpm_cand is signaled. sps_max_num_merge_cand_minus_max_num_gpm_cand is a parameter used to derive the maximum value MaxNumGpmMergeCand of the number of merge candidates for GPM prediction. In a case that MaxNumGpmMergeCand is zero (0), GPM prediction is prohibited.

The header decoder 3020 decodes a flag sps_gpm_lfnst_enabled_flag from the SPS. sps_gpm_lfnst_enabled_flag is a flag indicating whether to use non-separable transform (hereinafter GPM non-separable transform) in a case that the GPM prediction is performed. In a case that sps_lfnst_enabled_flag is 1 and sps_gpm_enabled_flag is 1, the header decoder 3020 decodes sps_gpm_lfnst_enabled_flag. Otherwise, sps_gpm_lfnst_enabled_flag=0 is set. A case of sps_gpm_lfnst_enabled_flag==1 indicates that the GPM non-separable transform may be applied, and a case of sps_gpm_lfnst_enabled_flag==0 indicates that the GPM non-separable transform is not applied.

The TU decoder 3024 decodes, from the coded data, a parameter lfnst_idx indicating whether a non-separable transform is used and the transform basis. Specifically, the TU decoder 3024 decodes lfnst_idx in a case that the widths and heights of the CUs are equal to or greater than 4 and the prediction mode is the intra prediction mode. Note that lfnst_idx being 0 indicates non-application of non-separable transform, lfnst_idx being 1 indicates one transform matrix of a set (pair) of transform matrices (transform basis) of non-separable transform, and lfnst_idx being 2 indicates the other transform matrix of the pair of transform matrices.

The prediction image generation unit 308 includes an inter prediction image generation unit 309 (FIG. 4) and an intra prediction image generation unit 310.

The prediction parameter derivation unit 320 includes an inter prediction parameter derivation unit 303 (FIG. 5) and an intra prediction parameter derivation unit.

In addition, although an example in which CTU and CU are used as a unit of processing will be described below, the unit of processing is not limited to this example, and processing may be performed on a sub-CU basis. Alternatively, the CTU or the CU may be referred to as a block, the sub-CU may be referred to as a subblock, and processing may be performed on a per-block or per-subblock basis.

The entropy decoder 301 performs entropy decoding on the coding stream Te input from the outside and decodes individual codes (syntax elements). The entropy coding includes a method in which variable-length coding of syntax elements is performed by using a context (probability model) adaptively selected according to a type of syntax element and a surrounding condition, and a method in which variable-length coding of syntax elements is performed by using a predetermined table or formula.

The entropy decoder 301 outputs the decoded codes to the parameter decoder 302. The decoded code is, for example, a prediction mode predMode, merge flag, merge idx, inter_pred_idc, refIdxLX, mvp_LX_idx, mvdLX, amvr_mode, and the like. Which code is to be decoded is controlled based on an indication of the parameter decoder 302.

Basic Flow

Figure 6:
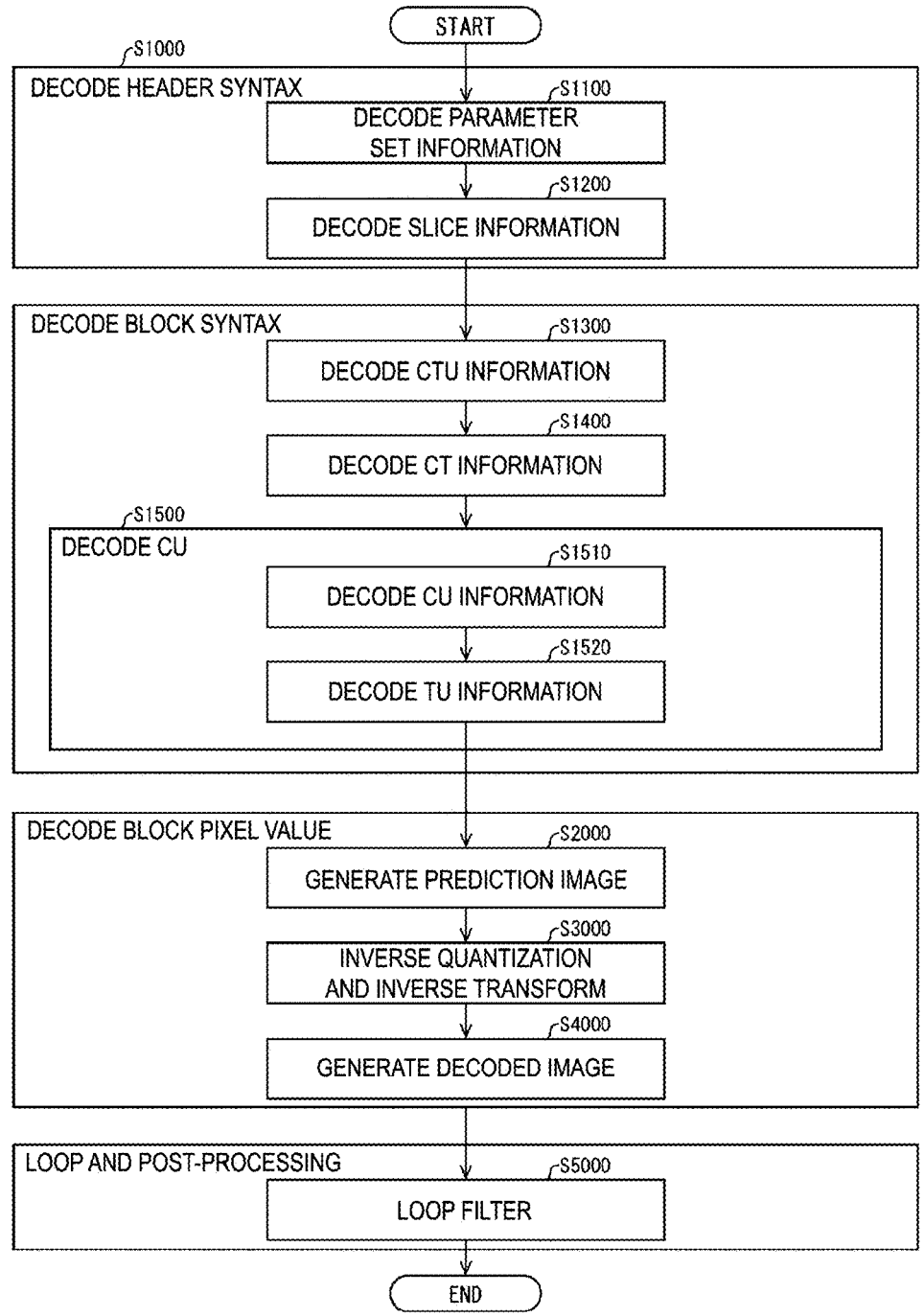
FIG. 6 is a flowchart illustrating general operation of the video decoding apparatus.

FIG. 6 is a flowchart illustrating general operation of the video decoding apparatus 31.

(S1100: Decoding of parameter set information) The header decoder 3020 decodes parameter set information such as a VPS, an SPS, and a PPS from coded data.

(S1200: Decoding of slice information) The header decoder 3020 decodes a slice header (slice information) from the coded data.

Afterwards, the video decoding apparatus 31 repeats the processing from S1300 to S5000 for each CTU included in the target picture, and thereby derives a decoded image of each CTU.

(S1300: Decoding of CTU information) The CT information decoder 3021 decodes the CTU from the coded data.

(S1400: Decoding of CT information) The CT information decoder 3021 decodes the CT from the coded data.

(S1500: Decoding of CU) The CU decoder 3022 decodes the CU from the coded data by performing S1510 and S1520.

(S1510: Decoding of CU information) The CU decoder 3022 decodes CU information, prediction information, a TU split flag, a CU residual flag, and the like from the coded data.

(S1520: Decoding of TU information) In a case that a prediction error is included in the TU, the TU decoder 3024 decodes, from the coded data, a quantization prediction error, a transform index lfnst_idx, and the like.

(S2000: Generation of prediction image) The prediction image generator 308 generates a prediction image, based on the prediction information, for each block included in the target CU.

(S3000: Inverse quantization and inverse transform) The inverse quantization and inverse transform processing unit 311 performs inverse quantization and inverse transform processing on each TU included in the target CU.

(S4000: Generation of decoded image) The addition unit 312 generates a decoded image of the target CU by adding the prediction image supplied by the prediction image generator 308 and the prediction error supplied by the inverse quantization and inverse transform processing unit 311.

(S5000: Loop filter) The loop filter 305 generates a decoded image by applying a loop filter such as a deblocking filter, an SAO, and an ALF to the decoded image.

The loop filter 305 is a filter provided in the coding loop, and is a filter that removes block distortion and ringing distortion and improves image quality. The loop filter 305 applies a filter such as a deblocking filter, a sample adaptive offset (SAO), and an adaptive loop filter (ALF) to a decoded image of a CU generated by the addition unit 312.

The reference picture memory 306 stores the decoded image of the CU generated by the addition unit 312 in a predetermined position for each target picture and target CU.

The prediction parameter memory 307 stores a prediction parameter in a position predetermined for each CTU or CU to be decoded. Specifically, the prediction parameter memory 307 stores the parameter decoded by the parameter decoder 302, the prediction mode predMode separated by the entropy decoder 301, and the like.

Figure 5:
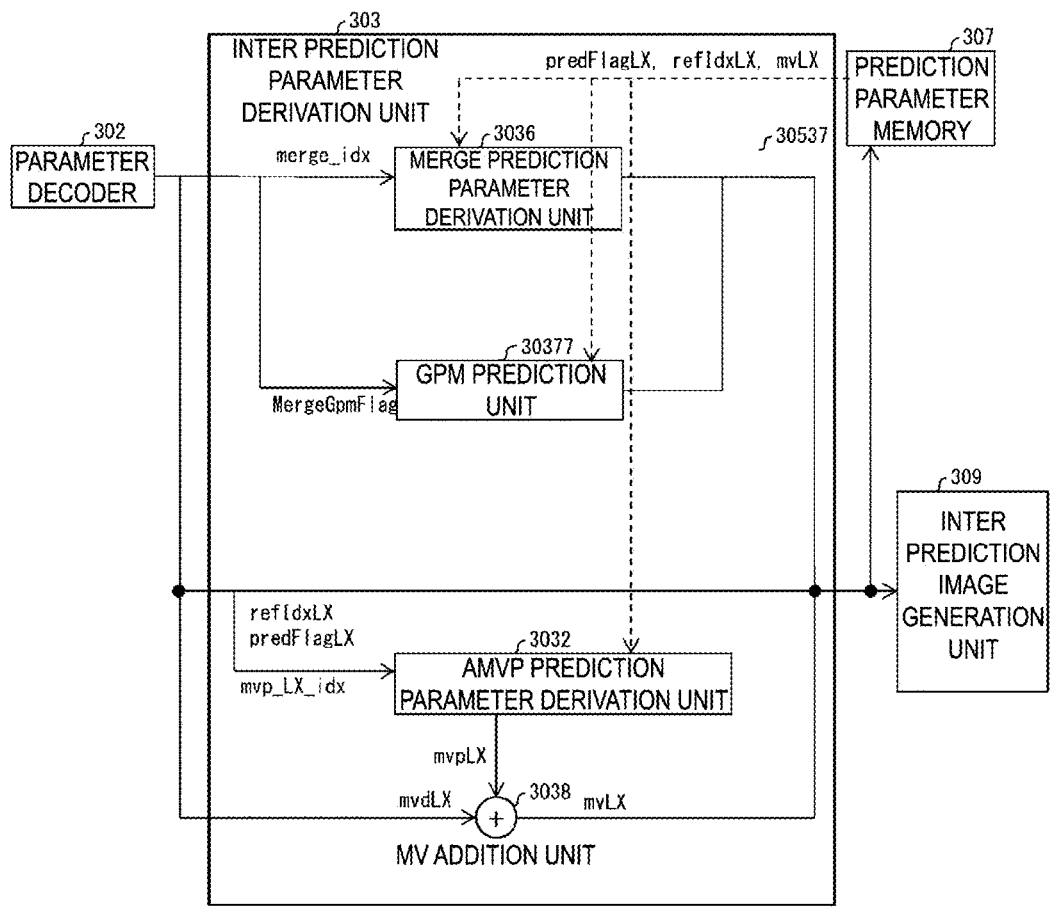
FIG. 5 is a schematic diagram illustrating a configuration of an inter prediction parameter derivation unit.

The prediction mode predMode, the prediction parameter, and the like are input to the prediction image generation unit 308. In addition, the prediction image generator 308 reads out a reference picture from the reference picture memory 306. The prediction image generation unit 308 generates a prediction image of a block or a subblock by using the prediction parameter and the read reference picture (reference picture block) in the prediction mode indicated by the prediction mode predMode. Here, the reference picture block refers to a set of pixels (referred to as a block because they are normally rectangular) on a reference picture and is a region that is referred to for generating a prediction image.
Configuration of Inter Prediction Parameter Derivation Unit As illustrated in FIG. 5, the inter prediction parameter derivation unit 303 derives an inter prediction parameter with reference to the prediction parameters stored in the prediction parameter memory 307 based on the syntax element input from the parameter decoder 302. In addition, the inter prediction parameter is output to the inter prediction image generation unit 309 and the prediction parameter memory 307. Since the inter prediction parameter derivation unit 303 and an AMVP prediction parameter derivation unit 3032, a merge prediction parameter derivation unit 3036, a GPM prediction unit 30377, and a MV addition unit 3038 serving as internal elements of the inter prediction parameter derivation unit 303 are means common to the video coding apparatus and the video decoding apparatus, they may be collectively referred to as a motion vector derivation unit (motion vector derivation apparatus).

In a case that merge flag indicates 1, that is, the merge prediction mode, merge idx is derived and output to the merge prediction parameter derivation unit 3036.

In a case that merge flag indicates 0, that is, the AMVP prediction mode, the AMVP prediction parameter derivation unit 3032 derives mvpLX from inter_pred_idc, refIdxLX, or mvp_LX_idx.

In a case that GPM flag is 1, that is, it is indicated that the target block is coded in the GPM prediction mode, the GPM prediction unit 30377 derives parameters for the GPM prediction. Derivation of GPM_flag will be described later.
MV Addition Unit The MV addition unit 3038 adds derived mvpLX and mvdLX together to derive mvLX.
Merge Prediction The merge prediction parameter derivation unit 3036 includes a merge candidate derivation unit 30361 and a merge candidate selection unit 30362. Note that a merge candidate includes the prediction parameters (predFlagLX, mvLX, and refIdxLX) and is stored in a merge candidate list. The merge candidate stored in the merge candidate list has an index assigned in accordance with a prescribed rule.

The merge candidate derivation unit 30361 derives the merge candidate using the motion vector and refIdxLX for the decoded adjacent block without any change. In addition, the merge candidate derivation unit 30361 may apply spatial merge candidate derivation processing, temporal merge candidate derivation processing, and the like described below.

As the spatial merge candidate derivation processing, the merge candidate derivation unit 30361 reads the prediction parameter stored in the prediction parameter memory 307 in accordance with a prescribed rule, and sets the prediction parameter as a merge candidate. For example, the prediction parameters at the positions of A1, B1, B0, A0, and B2 described below are read.

A1: $(xCb - 1, yCb + cbHeight - 1)$

B1: $(xCb + cbWidth - 1, yCb - 1)$

-continued

B0: $(xCb + cbWidth, yCb - 1)$

A0: $(xCb - 1, yCb + cbHeight)$

B2: $(xCb - 1, yCb - 1)$

The target block has upper left coordinates (xCb, yCb), a width cbWidth, and a height cbHeight.

As temporal merge derivation processing, the merge candidate derivation unit 30361 reads, from the prediction parameter memory 307, the prediction parameter for a block C in the reference image including the lower right coordinates CBR or the center coordinates of the target block, specifies the block C as a merge candidate Col, and stores the block C in the merge candidate list mergeCandList[ ].

The order of storage in mergeCandList[ ] is spatial merge candidates (B1, A1, B0, A0, and B2), and the temporal merge candidate Col. Note that a reference block that is not available (intra prediction block, or the like) is not stored in the merge candidate list.

```
i = 0
if (availableFlagB1)
    mergeCandList[i++] = B1
if (availableFlagA1)
    mergeCandList[i++] = A1
if (availableFlagB0)
    mergeCandList[i++] = B0
if (availableFlagA0)
    mergeCandList[i++] = A0
if (availableFlagB2)
    mergeCandList[i++] = B2
if (availableFlagCol)
    mergeCandList[i++] = Col
```

Furthermore, the history merge candidate HmvpCand, the average candidate avgCand, and the zero merge candidate zeroCandm may be added to mergeCandList[ ] and used.

The merge candidate selection unit 30362 selects a merge candidate N indicated by merge_idx from the merge candidates included in the merge candidate list, in accordance with the expression below.

$N$=mergeCandList[merge_idx]

Here, N is a label indicating a merge candidate, and takes A1, B1, B0, A0, B2, Col, and the like. The motion information of the merge candidate indicated by the label N is indicated by (mvLXN[0], mvLXN[1]), predFlagLXN, and refIdxLXN.

The selected (mvLXN[0], mvLXN[0]), predFlagLXN, and refIdxLXN are selected as inter prediction parameters for the target block. The merge candidate selection unit 30362 stores the inter prediction parameter for the selected merge candidate in the prediction parameter memory 307 and outputs the inter prediction parameter to the inter prediction image generation unit 309.
GPM Prediction The GPM prediction is prediction used in the GPM mode, in which a prediction image is generated using two non-rectangular prediction units obtained by splitting the target CU by a line segment. FIG. 8(a) illustrates examples of straight line segments. The straight line segments crossing the target CU are defined by an angle index angleIdx (angle variable) and a distance index distanceIdx (distance variable) indicated in FIG. 8(b). angleIdx represents an angle (p formed by a straight line in the vertical direction and the straight line segment. distanceIdx indicates a distance p from the center of the target CU to the straight line segment. angleIdx is an angle of a straight line segment allocated to an integer value, and for example, in a case that 360 degrees is roughly split into 32 equal parts, the values indicated in FIG. 8(c) are allocated. Note that 360 degrees may be split into 64, and a finer angle index may be sent.

In the prediction image generation in GPM prediction, two "rectangular" prediction images (temporary prediction images) including a non-rectangular prediction unit may be derived, and the two rectangular regions may be derived by performing weighting according to the shape of the prediction unit. A motion compensation unit 3091 derives two temporary prediction images of the target CU, and a GPM combining unit 30952 derives a prediction image by applying weighting processing corresponding to the position of a pixel to each pixel of the two temporary prediction images. This processing is referred to as a GPM combining process. Processing other than prediction (e.g., transform (inverse transform) and quantization (inverse quantization)) is applied to the entire target CU.

The GPM prediction unit 30377 derives the prediction parameters corresponding to the two non-rectangular regions and supplies the prediction parameters to the inter prediction image generation unit 309. The GPM prediction may be configured not to use bi-prediction for simplification of processing. In this case, an inter prediction parameter for uni-prediction is derived in one non-rectangular region.

Decoding of Syntax in GPM Prediction

FIG. 7 is a diagram illustrating a syntax configuration signaled using merge_data( ). The parameter decoder 302 decodes syntax elements in the coded data, and the GPM prediction unit 30377 (inter prediction parameter derivation unit 303) derives parameters for the GPM prediction.

general_merge_flag is a flag indicating whether the merge mode is used, which is signaled in a case that the target block is not in the skip mode. In a case of a skip mode, the inter prediction parameter derivation unit 303 sets general_merge_flag=1.

In a case that ciip_flag is 0, the parameter decoder 302 (CU decoder 3022) decodes the syntax elements merge_gpm_partition_idx, merge_gpm_idx0, and merge_gpm_idx1 for the GPM prediction. Alternatively, the parameter decoder 302 (CU decoder 3022) may decode merge_gpm_partition_idx and merge_gpm_idx0, and further decode merge_gpm_idx1 in a case that MaxNumGpmMergeCand >2. merge_gpm_partition_idx is an index (partition index) indicating a division pattern of the GPM prediction mode. The partition index indicates a combination of angleIdx and distanceIdx for identifying a straight line segment across the target block to split the target block into two regions. The merge candidates are used as the motion information used for the prediction image generation in GPM prediction. merge_gpm_idx0 and merge_gpm_idx1 are indices of merge candidates indicating motion information of the two regions, respectively. The number of partition index options (the number of division patterns) is NumGPMFull, and merge_gpm_partition_idx takes any integer value from 0 to NumGPMFull−1 (=63).

MergeGpmFlag is a flag indicating whether to perform GPM prediction in a target block. In a case that the following conditions (GPM determination conditions) are at least satisfied, the GPM prediction unit 30377 sets MergeGpmFlag=1 (GPM prediction is on); otherwise, the GPM prediction unit 30377 sets MergeGpmFlag=0.

GPM Determination Conditions
 sps_gpm_enabled_flag=1
 slice_type indicates the B slice
 general_merge_flag=1
 The target block is in a range of a prescribed size (for example, cbWidth>=8, cbHeight>=8, cbWidth<8*cbHeight, and cbHeight<8*cbWidth)
 regular_merge_flag=0
 merge_subblock_flag=0
 ciip_flag=0

The GPM prediction unit 30377 outputs derived parameters to the GPM combining unit 30952.

Motion Information Derivation Processing in GPM Prediction

The GPM prediction unit 30377 derives the merge indices m and n from the syntax elements merge_gpm_idx0 and merge_gpm_idx1 indicating the motion information of the two non-rectangular regions as follows.

$$m = \text{merge\_gpm\_idx0}$$

$$n = \text{merge\_gpm\_idx1} + (\text{merge\_gpm\_idx1} >= m) \text{ ? } 1:0$$

In the following, the merge candidate indicated by the merge index m is denoted as M and the merge candidate indicated by the merge index n is denoted as N.

The merge prediction parameter derivation unit 3036 derives motion information (mvLXM, mvLXN, refIdxLXM, refIdxLXN, predFlagLXM, predFlagLXN, mergeCandList, and the like) of the merge candidates M and N by the method described in Merge Prediction. The GPM prediction unit 30377 uses the motion information to set the motion vectors mvA and mvB of merge_gpm_idx0 and merge_gpm_idx1, the reference indices refIdxA and refIdxB, and the prediction list flags predListFlagA and predListFlagB as follows.
 mvA[0]=mvLXM[0]
 mvA[1]=mvLXM[1]
 refIdxA=refIdxLXM
 predListFlagA=X Here, the GPM prediction unit 30377 sets X equal to one least significant bit of m (m & 0x01). Note that, in a case that predFlagLXM is 0, the GPM prediction unit 30377 sets X equal to (1−X).
 mvB[0]=mvLXN[0]
 mvB[1]=mvLXN[1]
 refIdxB=refIdxLXN
 predListFlagB=X Here, the GPM prediction unit 30377 sets X equal to one least significant bit of n (n & 0x01). Note that, in a case that predFlagLXN is 0, the GPM prediction unit 30377 sets X equal to (1-X).

These pieces of motion information are referenced to generate temporary prediction images of the two non-rectangular regions.

The GPM prediction unit 30377 derives angleIdx and distanceIdx corresponding to merge_gpm_partition_idx according to the table illustrated in FIG. 9.

Motion Vector Storage Processing in GPM Prediction

The GPM prediction unit 30377 stores the motion vectors (mvA and mvB) of the non-rectangular regions A and B and the information of the reference picture (predFlagA, prefFlagB, refIdxLA, and refIdxLB) in the memory in units of 4×4 subblocks in the following procedure to be referred to in subsequent processing.

numSbX and numSbY are the number of 4×4 subblocks in the target block in the horizontal and vertical directions, respectively. The GPM prediction unit 30377 sets numSbX=cbWidth>>2 and numSbY=cbHeight>>2. The GPM prediction unit 30377 derives variables displacementX, displacementY, isFlip, and shiftHor as follows.

```
displacementX = angleIdx
displacementY = (angleIdx + 8) % 32
isFlip = (angleIdx >= 13 && angleIdx <= 27) ? 1 : 0
shiftHor = (angleIdx % 16 == 8 || (angleIdx % 16 != 0 && cbHeight >= cbWidth)) ? 0 : 1
```

The GPM prediction unit 30377 derives offsetX and offsetY as follows.

```
if (shiftHor == 0) {
    offsetX = (-cbWidth) >> 1
    offsetY = ((-cbHeight) >> 1) + ((angleIdx < 16) ? (distanceIdx * cbHeight) >> 3 : -(distanceIdx * cbHeight) >> 3))
} else { // shiftHor == 1
    offsetX = ((-cbWidth) >> 1) + ((angleIdx < 16) ? (distanceIdx * cbWidth) >> 3 : - ((distanceIdx * cbWidth) >> 3))
    offsetY = (-cbHeight) >> 1
}
```

The GPM prediction unit 30377 performs the following processing for each position (xSbIdx, ySbIdx) of the 4×4 subblock, in which xSbIdx=0, . . . , numSbX−1 and ySbIdx=0, . . . numSbY−1.

The GPM prediction unit 30377 calculates motionIdx as follows, using disLut illustrated in FIG. 9.

$$motionIdx = (((4*xSbIdx + offsetX) << 1) + 5)*disLut[displacementX] + \\ (((4*ySbIdx + offsetY) << 1) + 5)*disLut[displacementY]$$

The GPM prediction unit 30377 derives sType as follows.

$$sType = (abs(motionIdx) < 32)?\ 2: ((motionIdx <= 0)\ ?\ (1 - isFlip): isFlip)$$

In a case that sType is 0, the GPM prediction unit 30377 performs the following.

In a case that the prediction list flag of A is 0 (predListFlagA==0), the GPM prediction unit 30377 stores the motion vector of A in L0 as the uni-direction prediction. In a case that the prediction list flag of A is not 0 (predListFlagA !=0), the GPM prediction unit 30377 stores the motion vector of A in L1 as the uni-direction prediction.

predFlagL0=(predListFlagA==0)?1:0
predFlagL1=(predListFlagA==0)?0:1
refIdxL0=(predListFlagA==0)?refIdxA:−1
refIdxL1=(predListFlagA==0)?−1:refIdxA
mvL0[0]=(predListFlagA==0)?mvA[0]: 0
mvL0[1]=(predListFlagA==0)?mvA[1]: 0
mvL1[0]=(predListFlagA==0)?0:mvA[0]
mvL1[1]=(predListFlagA==0)?0:mvA[1]

Otherwise, in a case that sType is 1, or sType is 2 and predListFlagA+predListFlagB is not 1, the GPM prediction unit 30377 performs the following. Here, predListFlagA+predListFlagB not being 1 indicates that the reference picture lists of A and B are the same.

In a case that the prediction list flag of B is 0 (predListFlagB==0), the GPM prediction unit 30377 stores the motion vector of B in L0 as the uni-direction prediction. In a case that the prediction list flag of B is not 0 (predListFlagB !=0), the GPM prediction unit 30377 stores the motion vector of B in L1 as the uni-direction prediction.

predFlagL0=(predListFlagB==0)?1:0
predFlagL1=(predListFlagB==0)?0:1
refIdxL0=(predListFlagB==0)?refIdxB:−1
refIdxL1=(predListFlagB==0)?−1:refIdxB
mvL0[0]=(predListFlagB==0)?mvB[0]: 0
mvL0[1]=(predListFlagB==0)?mvB[1]: 0
mvL1[0]=(predListFlagB==0)?0:mvB[0]
mvL1[1]=(predListFlagB==0)?0:mvB[1]

Otherwise (in a case that sType is 2 and predListFlagA+predListFlagB is 1), the GPM prediction unit 30377 performs the following. Here, predListFlagA+predListFlagB being 1 indicates that the reference picture lists of A and B are different.

In a case that the prediction list flag of A is 0 (predListFlagA==0), the GPM prediction unit 30377 performs the bidirectional prediction in which the motion vector of A is stored in L0 and the motion vector of B is stored in L1. In a case that the prediction list flag of A is not 0 (predListFlagA !=0), the GPM prediction unit 30377 performs the bidirectional prediction in which the motion vector of B is stored in L0 and the motion vector of A is stored in L1.

predFlagL0=1
predFlagL1=1
refIdxL0=(predListFlagA==0)?refIdxA:refIdxB
refIdxL1=(predListFlagA==0)?refIdxB:refIdxA
mvL0[0]=(predListFlagA==0)?mvA[0]: mvB[0]
mvL0[1]=(predListFlagA==0)?mvA[1]: mvB[1]
mvL1[0]=(predListFlagA==0)?mvB[0]: mvA[0]
mvL1[1]=(predListFlagA==0)?mvB[1]: mvA[1]

Inter Prediction Image Generation Unit 309

In a case that predMode indicates the inter prediction mode, the inter prediction image generation unit 309 generates a prediction image of a block or a subblock through inter prediction by using the inter prediction parameters input from the inter prediction parameter derivation unit 303 and the reference picture.

Figure 4:
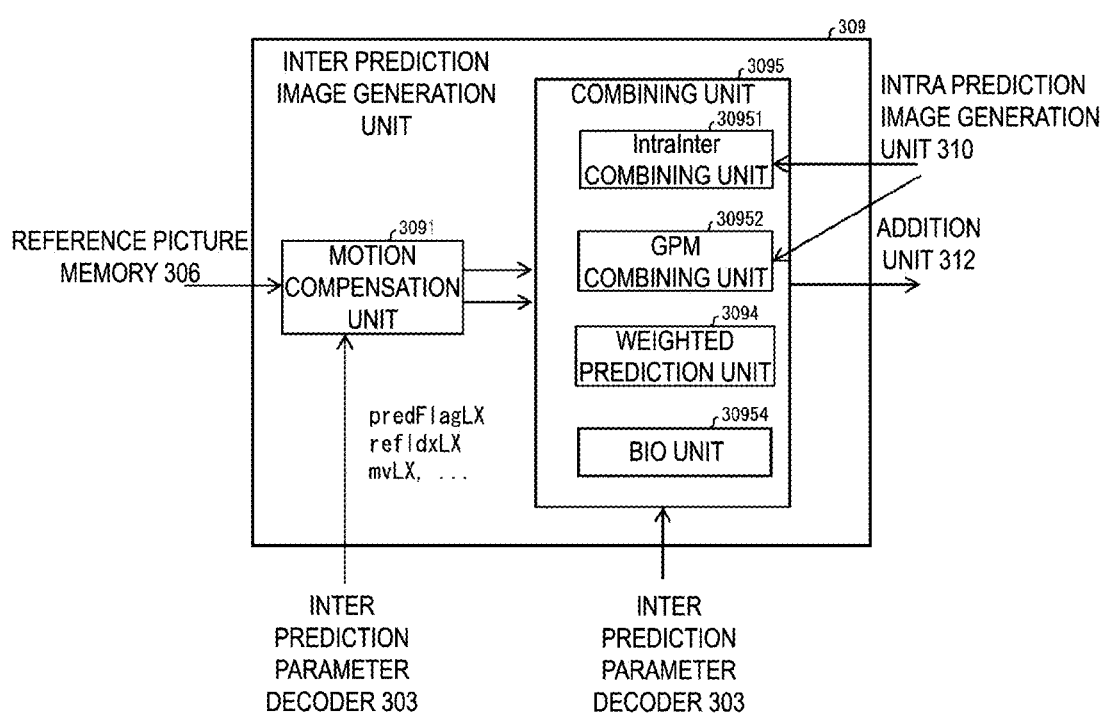
FIG. 4 is a schematic diagram illustrating a configuration of an inter prediction image generation unit.

FIG. 4 is a schematic diagram illustrating a configuration of the inter prediction image generation unit 309 included in the prediction image generation unit 308 according to the present embodiment. The inter prediction image generation unit 309 includes a motion compensation unit (prediction image generation apparatus) 3091 and a combining unit 3095. The combining unit 3095 includes an IntraInter combining unit 30951, a GPM combining unit 30952, a BIO unit 30954, and a weighted prediction unit 3094. The prediction image derived in the intra prediction image generation unit 310 is used for prediction image generation in the IntraInter combining unit 30951 and the GPM combining unit 30952.

Motion Compensation

The motion compensation unit 3091 (interpolation image generation unit 3091) generates an interpolation image (motion compensation image) by reading a reference block from the reference picture memory 306 based on the inter prediction parameters (predFlagLX, refIdxLX, and mvLX) input from the inter prediction parameter derivation unit 303. The reference block is a block located on the reference picture RefPicLX indicated by refIdxLX, at a position shifted by mvLX from the position of the target block. Here, in a case that mvLX does not have an integer precision, an interpolation image is generated by using a filter referred to as a motion compensation filter for generating pixels at the fractional positions.

The motion compensation unit 3091 first derives an integer position (xInt, yInt) and a phase (xFrac, yFrac) corresponding to in-prediction block coordinates (x, y) by the following expression.

$$xInt = xPb + (mvLX[0] >> (\log 2(MVPREC))) + x$$

$$xFrac = mvLX[0]\ \&\ (MVPREC - 1)$$

$$yInt = yPb + (mvLX[1] >> (\log 2(MVPREC))) + y$$

$$yFrac = mvLX[1]\ \&\ (MVPREC - 1)$$

Here, (xPb, yPb) indicates the upper left coordinates of a block with a bW*bH size, that is, x=0, . . . , bW−1, y=0, . . . , bH−1, and MVPREC indicates the precision of mvLX (1/MVPREC pixel precision). For example, MVPREC=16.

The motion compensation unit 3091 derives a temporary image temp[ ][ ] by performing a horizontal interpolation on a reference picture refImg using an interpolation filter. In the expression below, Σ is the sum related to k of k=0, . . . , NTAP−1, shift1 is a normalization parameter for adjusting a value range, and offset1=1<<(shift1−1).

$$temp[x][y] =$$

$$(\Sigma mcFilter[xFrac][k] * refImg[xInt + k - NTAP/2 + 1][yInt] + \text{offset1}) >> \text{shift1}$$

Subsequently, the motion compensation unit 3091 derives an interpolation image Pred[ ][ ] by performing a vertical interpolation processing on the temporary image temp[ ][ ]. In the expression below, Σ is the sum related to k of k=0, . . . , NTAP−1, shift2 is a normalization parameter for adjusting a value range, and offset2=1<<(shift2−1).

$$Pred[x][y] =$$

$$(\Sigma mcFilter[yFrac][k] * temp[x][y + k - NTAP/2 + 1] + \text{offset2}) >> \text{shift2}$$

Note that, for bi-prediction, Pred[ ][ ] described above is used to derive interpolation images PredL0[ ][ ] and PredL1[ ][ ] for each of the L0 list and the L1 list, and an interpolation image Pred[ ][ ] is generated from PredL0[ ][ ] and PredL1[ ][ ].

GPM Combining Unit 30952

The GPM combining unit 30952 derives a prediction image by using temporary prediction images predSamplesLA and predSamplesLB and a weight parameter derived from the angle variable. The temporary prediction images predSamplesLA and predSamplesLB are prediction images generated by the motion compensation unit 3091 by using the motion information (mvX, refIdxX, predListFlagX, X=A or B).

The GPM combining unit 30952 derives a prediction pixel value pbSample in the following procedure. Here, nCbW=cbWidth and nCbH=cbHeight.

Next, the GPM combining unit 30952 derives variables nW, nH, shift1, offset1, displacementX, displacementY, partFlip, and shiftHor as follows.

nW=(cIdx==0)?nCbW:nCbW*SubWidthC nH=(cIdx==0)?nCbH:nCbH*SubHeightC shift1=Max(5, 17−BitDepth)

offset1=1<<(shift1−1)

displacementX=angleIdx displacementY=(angleIdx+8)%32 partFlip=(angleIdx>=13 && angleIdx<=27)?0:1 shiftHor=(angleIdx % 16==8||(angleIdx %16!=0 && nH>=nW))?0:1

The GPM combining unit 30952 derives offsetX and offsetY as follows.

```
if (shiftHor == 0) {
  offsetX = (−nW) >> 1
  offsetY = ((−nH) >> 1) + (angleIdx < 16 ? (distanceIdx * nH) >> 3 :
    −((distanceIdx * nH) >>3 ))
} else //shiftHor == 1
{
  offsetX = ((−nW) >> 1) + (angleIdx < 16 ? (distanceIdx * nW) >> 3 :
    −((distanceIdx nW) >> 3))
  offsetY = (−nH) >> 1
}
```

The GPM combining unit 30952 derives a prediction pixel pbSamples according to the following steps.

1) The GPM combining unit 30952 derives generalized coordinates (xL, yL) from the coordinates (x, y) in the CU.

$$xL = (cIdx == 0)\ ?\ x:x * SubWidthC$$

$$yL = (cIdx == 0)\ ?\ y:y * SubHeightC$$

2) The GPM combining unit 30952 calculates the weight coefficient wValue according to the coordinates in the CU using disLut illustrated in FIG. 9(b) as follows.

$$weightIdx = (((xL + offsetX) << 1) + 1) * disLut[displacementX] +$$

$$(((yL + offsetY) << 1) + 1) * disLut[displacementY]$$

$$weightIdxL = partFlip\ ?\ 32 + weightIdx: 32 - weightIdx$$

$$wValue = \text{Clip3}(0, 8, (weightIdxL + 4) >> 3)$$

3) The GPM combining unit 30952 derives the value of pbSample as follows.

$$pbSamples[x][y] =$$

$$\text{Clip3}(0, (1 << BitDepth) - 1, (predSamplesLA[x][y] * wValue +$$

$$predSamplesLB[x][y] * (8 - wValue) + \text{offset1}) >> \text{shift1})$$

GPM Mode Using Intra Prediction

In the GPM mode, the GPM combining unit 30952 may generate a prediction image, using a weighted sum of an intra prediction image and an inter prediction image. In other words, one of predSamplesLA and predSamplesLB may be an intra prediction image predSamplesIntra, and the other may be an inter prediction image predSamplesInter.

$$pbSamples[x][y] =$$

$$\text{Clip3}(0, (1 << \text{BitDepth}) - 1, (predSamplesIntra[x][y] * wValue + predSamplesIner[x][y] * (8 - wValue) + \text{offset1}) >> \text{shift1})$$

In this case, in a case that ciip_flag[x0][y0] is 0, that is, the GPM mode is used, the CU decoder 3022 may decode merge_gpm_intra_flag from the coded data, and in a case that merge_gpm_intra_flag is true, the CU decoder 3022 may further decode IntraPredMode from the coded data.

The intra prediction may be allowed for both of the two prediction images. In this case, the CU decoder 3022 decodes merge_gpm_intra_flag0 and merge_gpm_intra_flag1. merge_gpm_intra_flag0 and merge_gpm_intra_flag1 are flags indicating whether the respective prediction images predSamplesLA and predSamplesLB are derived using the intra prediction.

IntraInter Combining Processing

In a case that ciip_mode is 1, the IntraInter combining unit 30951 generates a prediction image of the CIP mode. For example, a prediction image predSamplesComb[x][y] is generated using a weighted sum of an inter prediction image and an intra prediction image.

$$predSamplesComb[x][y] = (wIntra * predSamplesIntra[x][y] + (4 - wIntra) * predSamplesInter[x][y] + 2) >> 2$$

Here, predSamplesIntra[x][y] may be the intra prediction image, and may be planar prediction. predSamplesInter[x][y] is an inter prediction image. The IntraInter combining unit 30951 may derive a weight wIntra of the intra prediction image depending on the prediction mode of a left neighboring block and a top neighboring block of the target block.

wIntra=3 (CuPredMode of both of the left block and the top block is PRED_INTRA)

wIntra=2 (CuPredMode of one of the left block and the top block is PRED_INTRA)

wIntra=1 (otherwise, CuPredMode of neither the left nor the top is PRED_INTRA)

The IntraInter combining unit 30951 may derive wIntra, depending on the intra prediction mode of the target block and the position of the pixel in the target block.

```
predSamplesComb[x][y] = (wIntra * predSamplesIntra[x][y]
        + (8 - wIntra) * predSamplesInter[x][y] + 4) >> 3
    if (IntraPredMode == INTRA_PLANAR || IntraPredMode == INTRA_DC || nTbW <= 4
|| nTbH <= 4) // in a case that the player prediction, the DC prediction, or the block size is small
    {
        wIntra = 6 (CuPredMode of both of the left block and the top block is
PRED_INTRA)
        wIntra = 4 (CuPredMode of one of the left block and the top block is
PRED_INTRA)
        wIntra = 2 (otherwise, CuPredMode of neither the left nor the top is
PRED_INTRA)
    } else if (IntraPredMode < DIA_IDX) // in a case of the intra prediction mode more
horizontal than top left 45 degrees
        wIntra = 6 (xC < (nTbW >> 2))
        wIntra = 5 (in other cases and xC < (nTbW > 1))
        wIntra = 3 (in other cases and xC < 3 * (nTbW >> 2))
        wIntra = 2 (in other cases, xC >= 3 * (nTbW >> 2))
    } else { // in a case of the intra prediction mode more vertical than top left 45 degrees
        wIntra = 6 (yC < (nTbH >> 2))
        wIntra = 5 (in other cases and yC < (nTbH > 1))
        wIntra = 3 (in other cases and yC < 3 * (nTbH >> 2))
        wIntra = 2 (in other cases, yC >= 3 * (nTbH >> 2))
    }
```

Here, (xC, yC) represents the position of the target pixel, and nTbW and nTbH respectively represent the width and the height of the target block. In the intra prediction mode (<DIA_IDX) that is more horizontal, the IntraInter combining unit 30951 gradually reduces the size of wIntra as horizontal xC of the target pixel increase, and in the intra prediction mode (>=DIA_IDX) that is more vertical, the IntraInter combining unit 30951 gradually reduces the size of wIntra as yC increases. Otherwise, the weight is changed depending on the prediction mode of the neighboring block. In other words, based on xC and yC, as the position is further away from the boundary, the weight of the intra prediction image is reduced and the weight of the inter prediction image is increased.

BIO Prediction

In a bi-prediction mode, the BIO unit 30954 generates a prediction image with reference to two prediction images (first prediction image and second prediction image) and a gradient correction term.

Weighted Prediction

The weighted prediction unit 3094 generates a prediction image of a block by multiplying an interpolation image PredLX by a weight coefficient.

The inter prediction image generation unit 309 outputs the generated prediction image of the block to the addition unit 312.

Intra Prediction Image Generation Unit

In a case that predMode indicates an intra prediction mode, the intra prediction image generation unit performs intra prediction by using an intra prediction parameter input from the intra prediction parameter derivation unit and a reference pixel read out from the reference picture memory 306.

The inverse quantization and inverse transform processing unit 311 performs inverse quantization on a quantized transform coefficient input from the parameter decoder 302 to calculate a transform coefficient.

Inverse Quantization and Inverse Transform

Figure 11:
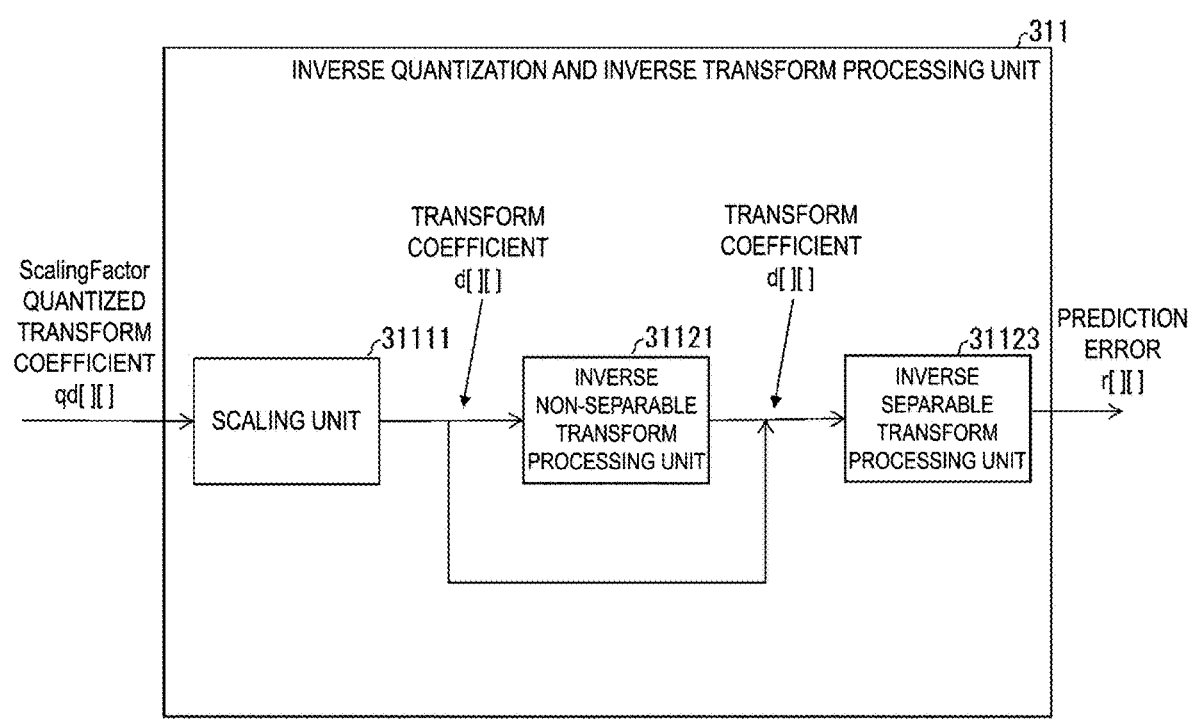
FIG. 11 is a functional block diagram illustrating a configuration example of an inverse quantization and inverse transform processing unit.

FIG. 11 is a block diagram illustrating a configuration of the inverse quantization and inverse transform processing unit 311 according to the present embodiment. The inverse quantization and inverse transform processing unit 311 includes a scaling unit 31111, an inverse non-separable transform processing unit 31121, and an inverse separable transform processing unit 31123.

The inverse quantization and inverse transform processing unit 311 scales (inverse-quantizes) the quantized transform coefficient qd[ ][ ] input from the entropy decoder 301 to obtain a transform coefficient d[ ][ ] by using the scaling unit 31111. The quantized transform coefficient qd[ ][ ] is a coefficient obtained by performing transform such as Discrete Cosine Transform (DCT) and Discrete Sine Transform (DST) on a prediction error and quantizing the transformed prediction error or a coefficient obtained by further performing non-separable transform on the transformed coefficient in a coding processing. In a case that lfnst_idx!=0, the inverse quantization and inverse transform processing unit 311 performs inverse transform by using the inverse non-separable transform processing unit 31121. Inverse frequency transform such as inverse DCT and inverse DST is further performed on the transform coefficient, and the prediction error is calculated. In addition, in a case that lfnst_idx==0, an inverse transform such as inverse DCT and inverse DST is performed on the transform coefficient scaled by the scaling unit 31111, without causing the inverse non-separable transform processing unit 31121 to perform, and the prediction error is calculated. The inverse quantization and inverse transform processing unit 311 outputs the prediction error to the addition unit 312.

Note that the inverse transform and the transform are paired processing, and thus the transform and the inverse transform may be interpreted as being replaced with each other. Alternatively, the transform may be referred to as forward transform in a case that the inverse transform is referred to as a transform. For example, the non-separable transform may be referred to as a forward non-separable transform in a case that the inverse non-separable transform is referred to as a non-separable transform. The separate transform is simply referred to as transform.

Details of Scaling Unit 31111

The scaling unit 31111 performs scaling by using a weight for each coefficient on the transform coefficient decoded by the TU decoder, using a quantization parameter and a scaling factor derived in the parameter decoder 302.

The scaled transform coefficient d[x][y] is transmitted to the inverse separable transform processing unit 31123 or the inverse non-separable transform processing unit 31121. The inverse non-separable transform processing unit 31121 applies the inverse non-separable transform to the transform coefficient d[ ][ ] after the inverse quantization and before the separable transform.

Non-Separable Transform

The inverse non-separable transform is applied to transform coefficients of a part or the entire region of a TU in the video decoding apparatus 31. After the inverse non-separable transform is applied, an inverse separable transform (such as DCT2 and DST7) is applied to the transform coefficients after the inverse non-separable transform. Furthermore, in a case that a TU is split into 4×4 subblocks, a non-separable transform and an inverse non-separable transform are applied only to a prescribed top-left subblock. Examples of sizes of a TU in which one of the width W and the height H of the TU is 4 include 4×4, 8×4, 4×8, L×4, and 4×L (L is a natural number of 16 or greater).

In addition, a technique for transmitting only some low-frequency components in transform coefficients after a separable transform is called Reduced Secondary Transform (RST) or Low Frequency Non-Separable Transform (LFNST). In particular, in a case that the number of transform coefficients of the non-separable transform to be transmitted nonZeroSize is less than or equal to the size of a separable transform ((1<<log 2StSize)×(1<<log 2StSize)), it is called LFNST. Note that, in the present specification, transform applied to a difference between the prediction image generated by the GPM combining unit 30952 and the original image is referred to as GPM non-separable transform (or GPM_LFNST). The inverse non-separable transform processing will be described below in order.

(S2000: Decoding of Non-Separable Transform Index)

FIG. 12 and FIG. 13 are examples of syntax tables illustrating flags of non-separable transform. FIG. 12 illustrates an example of signaling lfnst_idx and mtx_idx in the CU, and FIG. 13 illustrates an example of signaling lfnst_idx and mtx_idx in the TU. lfnst_idx is an index indicating whether the non-separable transform is used and the transform matrix, and mts_idx is an index indicating the transform matrix of the separable transform.

The TU decoder 3024 decodes lfnst_idx and mts_idx from the coded data. mts_idx may be decoded after lfnst_idx, and mtx_idx may be decoded only in a case that lfnst_idx is zero (0). That is, only in a case that no non-separable transform is used (lfnst_idx is 0), a configuration in which a transform matrix other than DCT2 indicated by mtx_idx!=0 may be used.

As illustrated in the figures, the TU decoder 3024 decodes lfnst_idx, depending on

--- if (condA && (condB || condC)) lfnst_idx
Here, condA, condB, and condC are derived using the following expression.
condA: sps_lfnst_enabled_flag == 1 && (IntraSubPartitionsSplitType != ISP_NO SPLIT || LfnstDcOnly == 0) && LfnstZeroOutSigCoeffFlag == 1
condB: CuPredMode[chType][x0][y0] == MODE_INTRA
condC: MergeGpmFlag == 1 || ciip_flag
    condA includes zero-out of the transform coefficient (LfnstZeroOutSigCoeffFlag == 1)

--- and the non-separable transform being available in the determination expression. condB includes the intra prediction in the determination expression.

condC is determination of the inter prediction (the GPM prediction or the CIP mode). Note that, in a case that the GPM mode or the CIP mode is used in a case that regular_merge_flag==0, condC may be determined as follows.

condC:regular_merge_mode==0

Note that, in a case that regular_merge_mode is not decoded in the intra prediction mode (in this case, general_merge_flag=0 and merge_subblock_flag=0), even without condB, the same determination can be performed based on regular_merge_mode=general_merge_flag && !merge_subblock_flag, using regular_merge_mode=0. In other words, the TU decoder 3024 may decode lfnst_idx, using the following determination, if(condA && regular_merge_mode==0)decode lfnst_idx.

In other words, in a case of the intra prediction, or the GPM mode or the CIP mode, the TU decoder 3024 may decode lfnst_idx from the coded data.

In a case of the intra prediction, the TU decoder 3024 may derive a value of ApplyLfnstFlag using lfnst_idx, and in a case other than the intra prediction, the TU decoder 3024 may derive the value without using lfnst_idx.

$ApplyLfnstFlag = ((MergeGpmFlag == 1)||$ $(CuPredMode == MODE\_INTRA \&\& lfnst\_idx > 0)) ? 1:0$ The following may be employed.

$ApplyLfnstFlag =$ $(((CuPredMode != MODE\_INTRA \&\& regular\_merge\_flag == 0)$ $|| lfnst\_idx > 0))?1:0$ Derivation of Transform Matrix The inverse non-separable transform processing unit 31121 derives a transform matrix secTransMatrix[ ][ ] used in a transform processing.

Specifically, in a case that the prediction mode is intra prediction, the inverse non-separable transform processing unit 31121 derives lfnstTrSetId from the intra prediction mode IntraPredMode. In a case that the prediction mode is the GPM prediction, lfnstTrSetId is derived from the angle index angleIdx of the GPM (or the mode number merge_gpm_partition_idx of the GPM). lfnstTrSetId is a number indicating a set of transform matrices of a non-separable transform. Note that a transform matrix (or a set of transform matrices) corresponding to lfnstTrSetId=K is hereinafter referred to as MK.

FIG. 14 is a table used to select a transform matrix of a non-separable transform in an intra prediction mode. The inverse non-separable transform processing unit 31121 may derive a matrix of the non-separable transform, here, a set number (lfnstTrSetId) of a transform matrix, from the intra prediction mode IntraPredMode using the table of FIG. 14. Alternatively, a look-up table nstSetTableIntra may be used to derive lfnstTrSetId as follows.

lfnstTrSetIdx=nstSetTableIntra[IntraPredMode]

nstSetTableIntra[ ]={2, 2, 3, 3, 3, 3, 3, 2, 2, 2, 1, 1, 1, 1, 1, 2, 2, 2, 3, 3, 3, 3, 3, 2, 2, 2, 1, 1, 1, 1, 1, 2}

In the non-separable transform, multiple predetermined transform matrices can be used, and a suitable transform can be performed by selecting an appropriate transform matrix from the intra prediction mode and the GPM mode.

The following example describes processing using a look-up table.

The inverse non-separable transform processing unit 31121 derives the transform matrix secTransMatrix[ ][ ] from the set number (lfnstTrSetId) of the non-separable transform, lfnst_idx indicating the transform matrix of the non-separable transform, and the non-separable transform size nStSize (nTrS). For example, derivation may be performed as follows.

secTransMatrix[ ][ ]=secTransMatrixTbl[nTrS][lfnstTrSetId][lfnst_idx−1][ ][ ]

The non-separable transform processing will be described below in order.

(S2201): Configuration of Conversion Size and Input/Output Size)

The inverse non-separable transform processing unit 31121 derives the size nStSize (=1<<log 2StSize) of the transform matrix, the logarithmic value log 2StSize of the size of the transform matrix, the number nonZeroSize of input transform coefficients, and the number nStOutSize of output transform coefficients, depending on the size (the width nTbW and the height nTbH) of the TU.

For example, derivation may be performed using the following expression.

$nStOutSize =$ $(nTbW >= 16 \&\& nTbH >= 16)? 96: (nTbW >= 8 \&\& nTbH >= 8)?64:16$ $\log 2StSize =$ $(nTbW >= 16 \&\& nTbH >= 16)? 4: (nTbW >= 8 \&\& nTbH >= 8) ? 3:2$ Derivation may be performed using the following expression.

$$nStOutSize =$$
$$(nTbW >= 16 \,\&\&\, nTbH >= 16)?\, 96:(nTbW >= 8 \,\&\&\, nTbH >= 8)?32:16$$

$$log2StSize =$$
$$(nTbW >= 16 \,\&\&\, nTbH >= 16)?\, 4:(nTbW >= 8 \,\&\&\, nTbH >= 8)\, ?\, 3:2$$

Derivation may be performed using the following expression.

$$nStOutSize = ((nTbW >= 8 \,\&\&\, nTbH >= 8)?\, 64:16$$

$$log2StSize = ((nTbW >= 8 \,\&\&\, nTbH >= 8)?\, 3:2$$

The inverse non-separable transform processing unit 31121 may derive nonZeroSize as follows.

$$nonZeroSize = (nTbW >= 16 \,\&\&\, nTbH >= 16)?\, 32:16$$

nonZeroSize may be derived as follows.

$$nonZeroSize =$$
$$(nTbW >= 16 \,\&\&\, nTbH >= 16)?32:(nTbW == 8 \,\&\&\, nTbH == 8))?\, 8:16$$

nonZeroSize may be derived as follows.

$$nonZeroSize =$$
$$(nTbW == 4 \,\&\&\, nTbH == 4)||(nTbW == 8 \,\&\&\, nTbH == 8))?\, 8:16$$

Note that nonZeroSize is not limited to 8 and 16. For example, it may be 12, 32, or the like. nStOutSize is not limited to 16 and 64 either, and may be 32, 48, 64, 96, or the like.
  For example, the following may be employed.
  In a case that nTbW and nTbH are both 8 or greater, log 2StSize=3 and nStOutSize=48 are set.
  Otherwise, log 2StSize=2 and nStOutSize=16 are set.
  In a case that nTbW and nTbH are both 4 or both 8, nonZeroSize=8 is set.
  Otherwise, nonZeroSize=16 is set.
  The above can be represented in the following expression.

$$nStOutSize = (nTbW >= 8 \,\&\&\, nTbH >= 8)?\, 48:16$$

$$nonZeroSize =$$
$$((nTbW == 4 \,\&\&\, nTbH == 4)|| (nTbW == 8 \,\&\&\, nTbH == 8))?\, 8:16$$

$$log2StSize = (nTbW >= 8 \,\&\&\, nTbH >= 8)?\, 3:2$$

In addition, the numbers numStX and numStY of the subblocks to which the inverse non-separable transform is applied may be derived depending on the size of the TU.

$$numStX = (nTbH == 4 \,\&\&\, nTbW > 8)?\, 2:1$$

$$numStY = (nTbW == 4 \,\&\&\, nTbH > 8)?\, 2:1$$

Note that numStX=numStY may be invariably set, without performing the non-separable transform on multiple sub-blocks.

(S2202: Rearrangement in One-Dimensional Array)

The inverse non-separable transform processing unit 31121 rearranges a transform coefficient d[ ][ ] of a part of the TU in a one-dimensional array u[ ]. Specifically, the inverse non-separable transform processing unit 31121 derives u[ ] from the two-dimensional transform coefficient d[ ][ ] of the target TU indicated by a region RU with reference to the transform coefficient of x=0, . . . , nonZeroSize−1. xC and yC are positions on the TU, and are derived from the array DiagScanOrder indicating the scan order and the position x of the array u[ ].

$$xC = (xSbIdx \ll log2StSize) + DiagScanOrder[log2StSize][log2StSize][x][0]$$

$$yC = (ySbIdx \ll log2StSize) + DiagScanOrder[log2StSize][log2StSize][x][1]$$

$$u[x] = d[xC][yC]$$

In a case that only a top left subblock is processed, $$xC = DiagScanOrder[log2StSize][log2StSize][x][0]$$

$$yC = DiagScanOrder[log2StSize][log2StSize][x][1]$$

$$u[x] = d[xC][yC]$$

Note that a range copied in the one-dimensional array is referred to as a region RU.

(S2203: Application of Transform Processing)

The inverse non-separable transform processing unit 31121 transforms u[ ] having a length of nonZeroSize using a transform matrix secTransMatrix[ ][ ], and derives a coefficient v[ ] of a one-dimensional array having a length of nStOutSize as an output.

$$v[i] = Clip3(CoeffMin, CoeffMax, \Sigma(secTransMatrix[i][j] * u[j] + 64) \gg 7)$$

Here, Σ is the sum up to j=0, . . . , nonZeroSize−1. In addition, i performs processing on 0, nStSize−1. CoeffMin and CoeffMax indicate a range of transform coefficient values. As will be described later, secTransMatrixDC may be used as secTransMatrix.

(S2204: Two-Dimensional Arrangement of One-Dimensional Array after Transform Processing)

The inverse non-separable transform processing unit 31121 arranges the coefficient v[ ] of the transformed one-dimensional array at a prescribed position in the TU (d[ ][ ]) again. Specifically, the following processing is performed on x=0, . . . , nStSize−1 and y=0, . . . nStSize−1.

```
if (transposeFlag == 0)
    d[x][y]= (y < 4 && x < 0) ? v[x + (y << log2StSize)] : d[x][y])
else
    d[x][y]= (x < 4 && y < 0) ? v[y + (x << log2StSize)] : d[x][y])
```

In this case, transposition processing is performed depending on symmetry used in transform matrix derivation. Whether to perform the transposition processing is determined by a flag transposeFlag for coefficient transposition processing.

Derivation of Transposition Flag in Case of Intra Prediction

Figure 10:
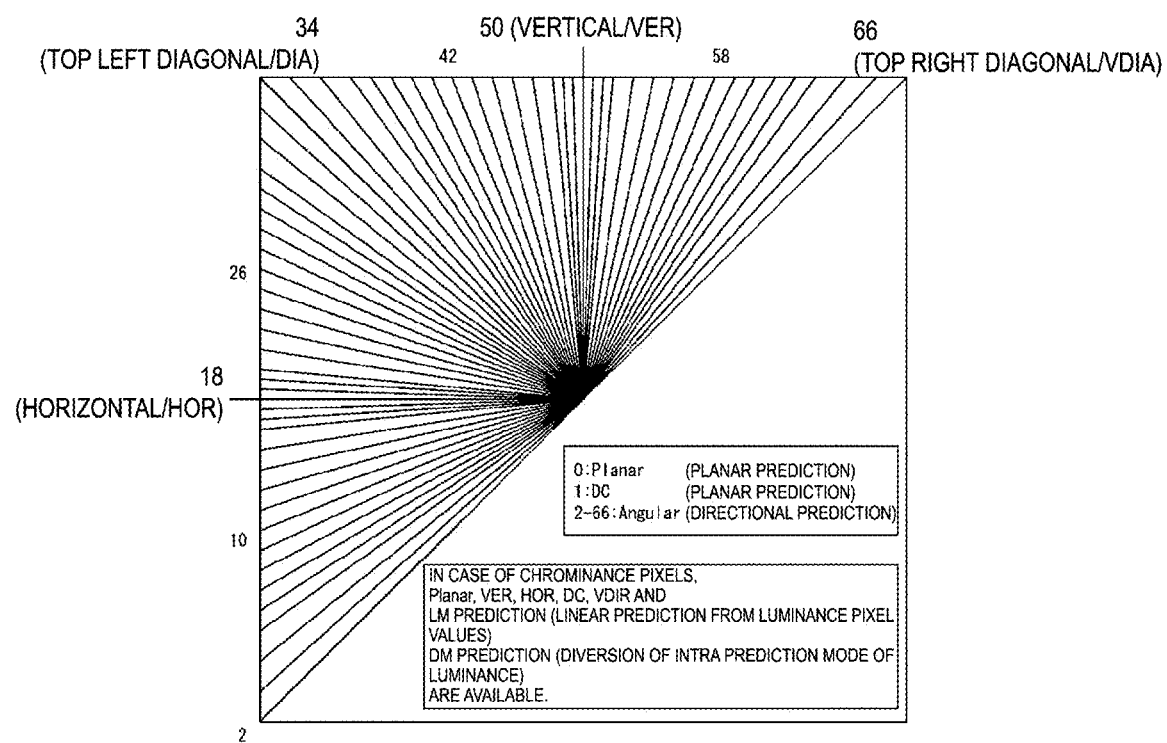
FIG. 10 is a schematic diagram illustrating types (mode numbers) of an intra prediction mode.

In a case that the prediction mode is the intra prediction, in a case that the intra prediction mode PredModeIntra>34, the inverse non-separable transform processing unit 31121 sets transposeFlag=1, and in a case that PredModeIntra<=34, the inverse non-separable transform processing unit 31121 sets transposeFlag=0. PredModeIntra is a prediction direction illustrated in FIG. 10.

In a case of the GPM prediction, the inverse non-separable transform processing unit 31121 sets transposeFlag, depending on merge_gpm_partition_idx. For example, in a case that merge_gpm_partition_idx<=13 or merge_gpm_partition_idx>46, transposeFlag=1 is set, and in a case that 13<merge_gpm_partition_idx<=46, transposeFlag=0 is set. It may be derived from angleIdx.

$$transposeFlag = (0 < angleIdx - 4 \;\&\&\; angleIdx - 4 <= 16)?\; 0:1$$

In a case that nStOutSize==64 (64 coefficients), the inverse non-separable transform processing unit 31121 may perform the following processing.

```
if (transposeFlag == 0)
    d[x][y]= (x < 8 && y < 8) ? v[x + (y << log2StSize)] : d[x][y]
else
    d[x][y]= (x < 8 && y < 8) ? v[y + (x << log2StSize)] : d[x][y]
```

In a case that nStOutSize==96 (96 coefficients), the inverse non-separable transform processing unit 31121 may perform the following processing.

```
if (transposeFlag == 0)
    d[x][y] = (y < 4) ? v[x + (y << log2StSize)] : (y < 8) ? v[x + 48 +
    ((y − 4) << 3)] : (y < 12) ? v[x + 80 + ((y − 8) << 2)] : d[x][y])
else
    d[x][y] = (x < 4) ? v[y + (x << log2StSize)] : (x < 8) ? v[y + 48 +
    ((x − 4) << 3] : (x < 12) ? v[y + 80 + ((x−8) << 2)] : d[x][y])
```

In addition, in a case that nStOutSize==48 (48 coefficients), the inverse non-separable transform processing unit 31121 may perform the following processing.

```
if (transposeFlag == 0)
    d[x][y] = (y < 4) ? v[x + (y << log2StSize)] : ((x < 4) ? v[32 + x +
    ((y − 4) << 2)] : d[x][y])
else
    d[x][y] = (x < 4) ? v[y + (x << log2StSize)] : ((y < 4) ? v[32 + y +
    ((x − 4) << 2)] : d[x][y])
```

Configuration of Switching Non-Separable Transform Depending on Prediction Mode

Figure 15:
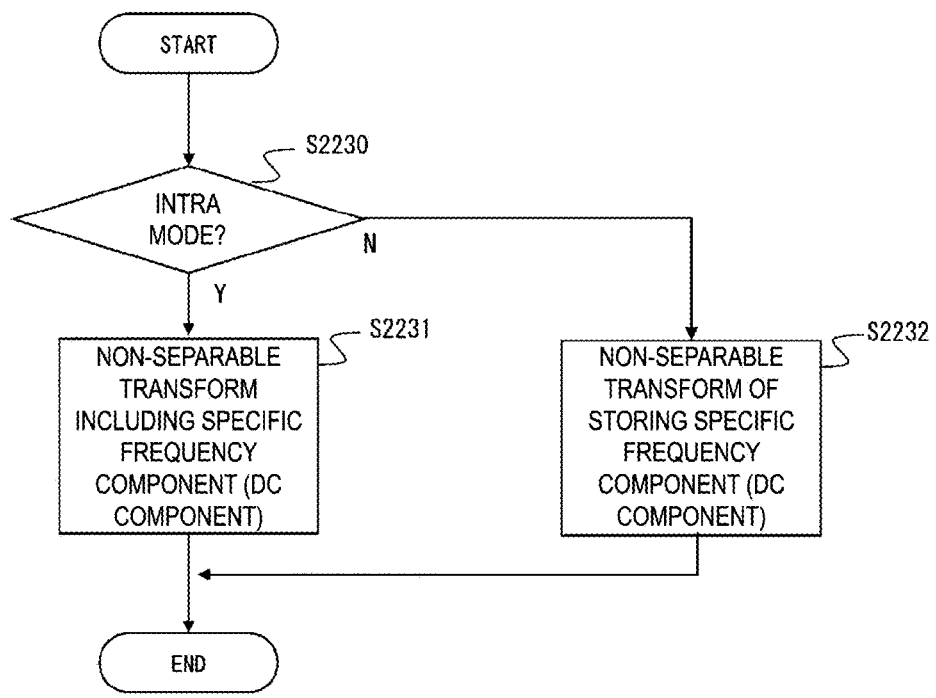
FIG. 15 is a flowchart illustrating processing of switching the non-separable transform depending on a prediction mode.

FIG. 15 is a flowchart illustrating processing of switching the non-separable transform depending on the prediction mode.

(S2230) Depending on the prediction mode, the processing proceeds to S2231 or S2232. In the prediction mode in which there is a large number of transform coefficients, such as the intra prediction, it is preferable that the processing proceed to S2231, and in a case of the inter prediction in which there is a small number of transform coefficients, it is preferable that the processing proceed to S2232. In the inter prediction or the like in which a pixel other than a neighboring pixel of the target block is used as a reference pixel, a correlation between the DC component and the AC component is low. In such a case, the processing may proceed to S2232, otherwise the processing may proceed to S2231. For example, in a case of the intra prediction as illustrated in the figure, the processing may proceed to S2231, otherwise the processing may proceed to S2232. Note that, in a case of the intra prediction mode or the CIP mode, the processing may proceed to S2231, otherwise the processing may proceed to S2232. In a case of the intra prediction mode, the CIP mode, or the GPM using the intra prediction, the processing may proceed to S2231, otherwise the processing may proceed to S2232.

(S2231) The inverse non-separable transform processing unit 31121 performs the non-separable transform on the transform coefficient including a specific frequency component (DC component).

(S2232) The inverse non-separable transform processing unit 31121 performs the non-separable transform on the transform coefficient to store the specific frequency component (DC component). Here, "to store" means to not change a value. Note that a case of inverting polarity may also be included in "to store". For example, the non-separable transform may be performed on the transform coefficient except the specific frequency component (DC component). For example, although the non-separable transform is performed on the transform coefficient including the specific frequency component (DC component), a transform matrix that does not change the DC component may be used.

According to the configuration described above, the non-separable transform processing unit 31121 does not change the specific frequency component of the transform coefficient. The inverse non-separable transform processing unit 31121 may not change the DC component being the top left component (for example, coordinates in the block xC==0 and yC==0). In a case of the inter prediction, the specific frequency component may not be changed. As illustrated in the figure, in a case that the prediction mode of the target block is the inter prediction, the inverse non-separable transform processing unit 31121 may not change the DC component being the top left component.

According to the configuration described above, non-zero transform coefficients concentrate on the specific frequency (for example, the DC component) in the frequency transform of DCT2, DST7, and the like, such as the inter prediction, and the effect of the non-separable transform can be achieved even in a case that there is a small number of non-zero coefficients, and the effect of enhancing coding efficiency can be achieved. In other words, the non-separable transform can prevent distribution (conversely, reduction of a degree of concentration) of the non-zero transform coefficients concentrated on the specific frequency to coefficients other than the specific frequency. In the intra prediction of performing prediction from a neighboring pixel around the target block, there is a correlation between residuals of a DC coefficient and residuals of an AC coefficient, and thus the non-separable transform between the DC coefficient and the AC coefficient is effective. However, in a case of the inter prediction of performing prediction from an image in a different time or layer, there is a change in luminance and chrominance, which is referred to as a DC offset, and a correlation between the residuals of the DC coefficient and the residuals of the AC coefficient is unfixed. In such a case, the non-separable transform of storing the DC component has an effect of enhancing coding efficiency.

Configuration of Transforming Components except DC Component in Non-Separable Transform A configuration will be described in which the value of the DC component of the transform coefficient of the lowest dimensional in the non-separable transform is output as it is, and a component (AC component) except the DC component is transformed. Configurations include a method of performing transform except the DC coefficient and a configuration of performing transform using the transform matrix that does not change the DC coefficient. The inverse non-separable transform processing unit 31121 may derive a one-dimensional array excluding the DC component, and perform transform on the one-dimensional array (configuration 1 and configuration 2). The inverse non-separable transform processing unit 31121 may use the transform matrix in which a left edge component and a top edge component, except the top left component, are 0 (configuration 3). According to the following configuration, in a case of prediction from a pixel in a different time or in a case that a correlation between residuals of the DC coefficient and residuals of the AC coefficient is unfixed, a correlation of DC coefficients is not used. The non-separable transform of storing the DC component has an effect of enhancing coding efficiency.

Configuration 1 of Non-Separable Transform except DC Component

Figure 16:
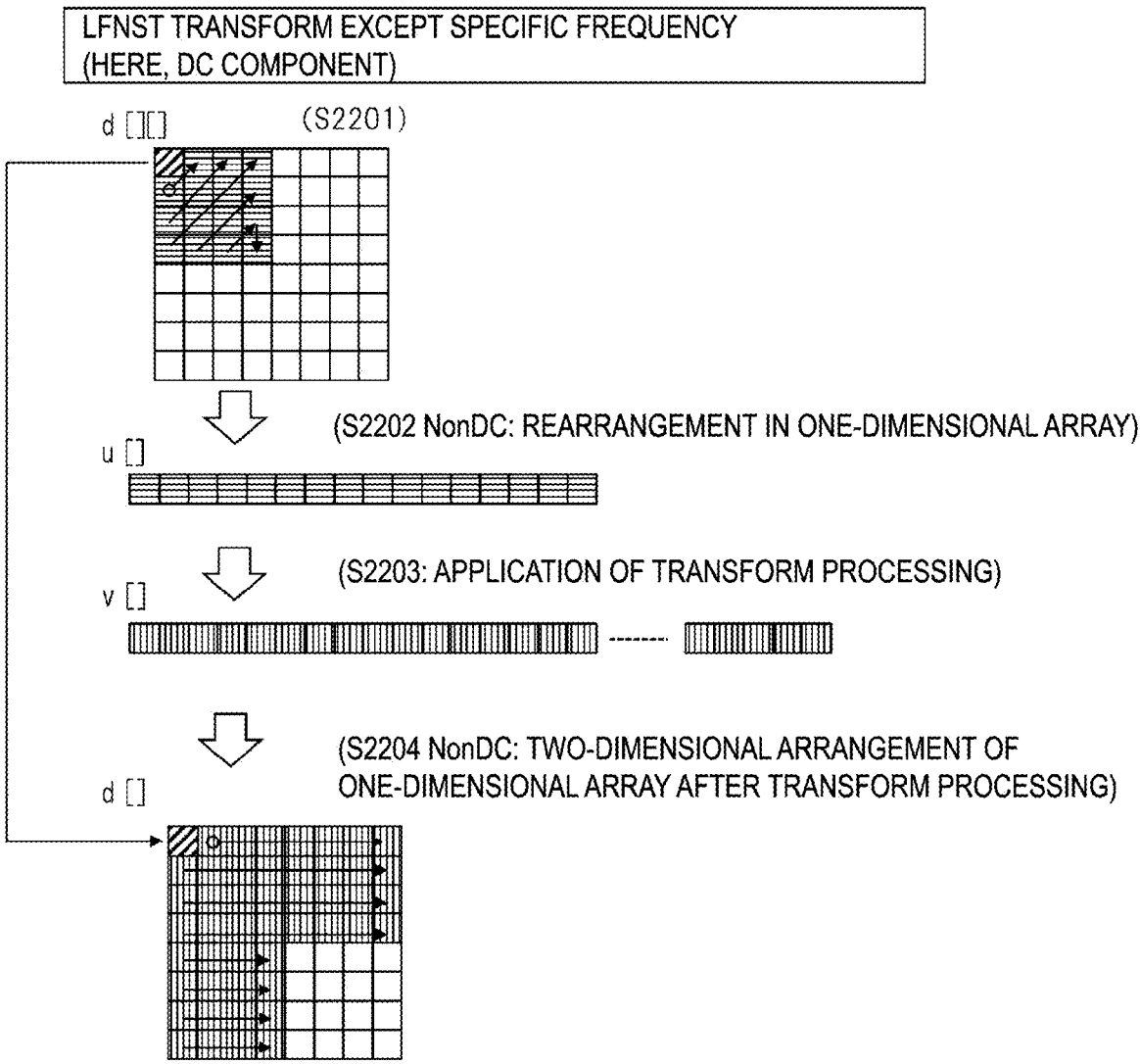
FIG. 16 is a diagram illustrating a configuration of operation of inverse non-separable transform of storing DC transform.

FIG. 16 is a diagram illustrating a configuration of operation of the inverse non-separable transform of storing DC transform.

As illustrated in the figure, the inverse non-separable transform processing unit 31121 changes S2202 and S2204 among S2201 to S2204 described above, and thereby performs the inverse non-separable transform processing other than the DC component.

(S2202 NonDC: Rearrangement in One-Dimensional Array)

The inverse non-separable transform processing unit 31121 rearranges a transform coefficient d[ ][ ] of a part of the TU in a one-dimensional array u[ ]. Specifically, the inverse non-separable transform processing unit 31121 derives u[ ] from the two-dimensional transform coefficient d[ ][ ] of the target TU indicated by a region RU with reference to the transform coefficient of x=1, . . . , nonZeroSize−1 (from a component except a first component x==0 in scan order). xC and yC are positions on the TU, and are derived from the array DiagScanOrder indicating the scan order and the position x of the array u[ ].

$$xC = (xSbIdx \ll \log 2StSize) + DiagScanOrder[\log 2StSize][\log 2StSize][x][0]$$

$$yC = (xSbIdx \ll \log 2StSize) + DiagScanOrder[\log 2StSize][\log 2StSize][x][1]$$

$$u[x-1] = d[xC][yC]$$

In a case that only a top left subblock is processed, $$xC = DiagScanOrder[\log 2StSize][\log 2StSize][x][0]$$

$$yC = DiagScanOrder[\log 2StSize][\log 2StSize][x][1]$$

$$u[x-1] = d[xC][yC]$$

Here, regarding a scan position, the one-dimensional array u[x] is derived from residuals except the DC component, with x=1, . . . , nonZeroSize−1. As described in S2203, the inverse non-separable transform processing unit 31121 transforms u[x] to v[ ], using the transform matrix.

(S2204 NonDC: Two-Dimensional Arrangement of One-Dimensional Array after Transform Processing)

The inverse non-separable transform processing unit 31121 arranges the coefficient v[ ] of the transformed one-dimensional array at a prescribed position in the TU (d[ ][ ]) again. Specifically, the following processing is performed on x=0, . . . , nStSize−1 and y=0, . . . nStSize−1. The feature lies in that the value of the position d[0][0] of DC is not changed.

--- if (transposeFlag == 0)
   d[x][y] = ((x != 0 || y != 0) && y < 4 && x < 0) ? v[x − 1 + (y << log2StSize)] : d[x][y])
else
   d[x][y] = ((x != 0 || y != 0) && x < 4 && y < 0) ? v[y − 1 + (x << log2StSize)] : d[x][y])

---

Here, in a case other than the DC component (x !=0||y !=0), v[ ] is selected, otherwise (x==0 && y==0) d[x][y] is used as it is. In determination of (x !=0||y !=0), (x+y !=0) may be used. For "!=0", ">0" may be used. In a case of assignment from a one-dimensional array v[ ] to a two-dimensional array d[ ][ ] with x=0, . . . , nStSize−1 and y=0, . . . , nStSize−1, the assignment may be performed except x=0 and y=0 (scanning may be performed except x=0 and y=0).

Configuration 2 of Non-Separable Transform except DC Component

Figure 17:
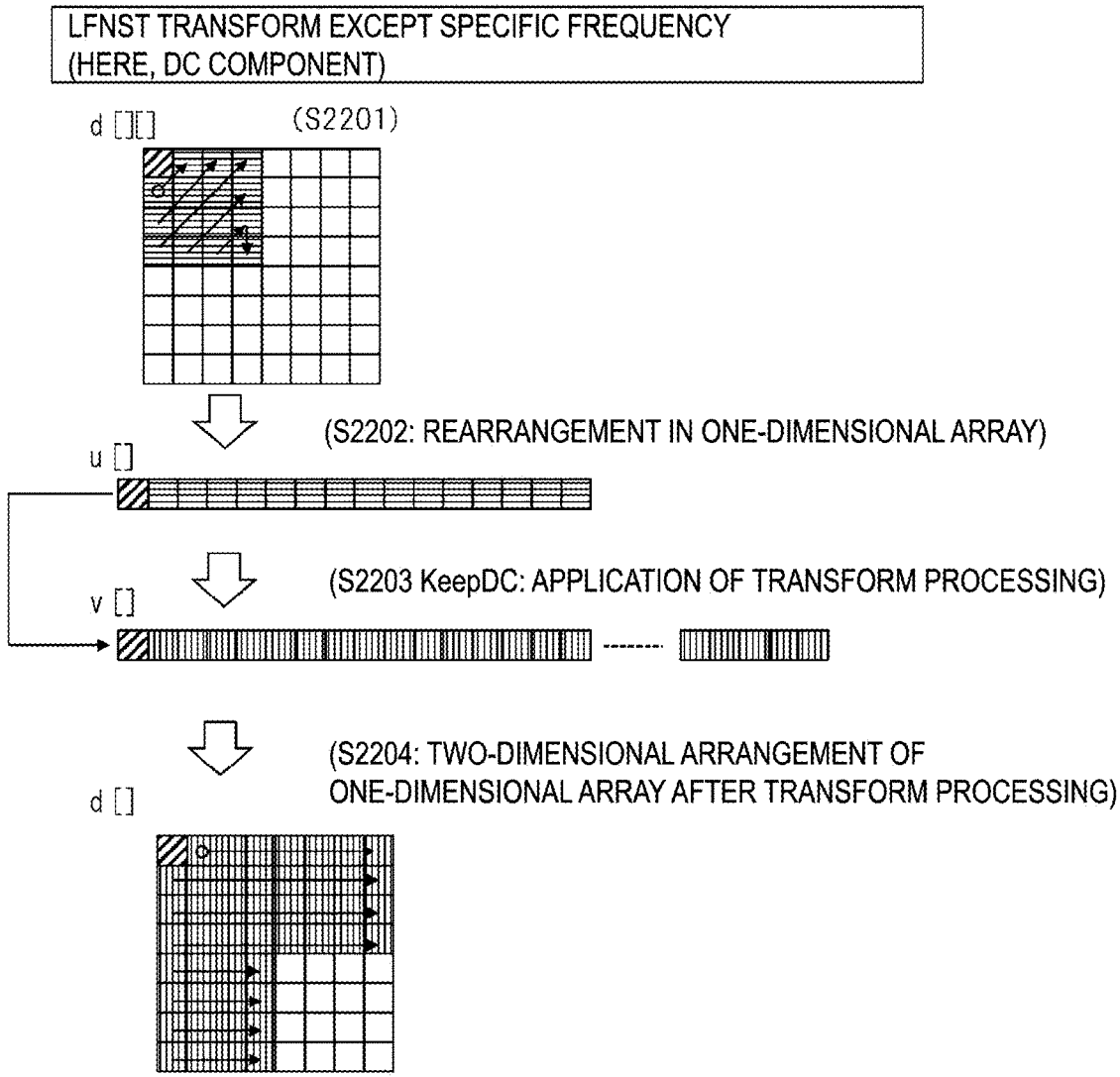
FIG. 17 is a diagram illustrating another configuration of operation of inverse non-separable transform of storing DC transform.

FIG. 17 is a diagram illustrating another configuration of operation of the inverse non-separable transform of storing DC transform.

As illustrated in the figure, the inverse non-separable transform processing unit 31121 changes S2203 among S2201 to S2204 described above, and thereby performs the inverse non-separable transform processing other than the DC component.

(S2203 KeepDC: Application of Transform Processing)

The inverse non-separable transform processing unit 31121 transforms u[ ] having a length of nonZeroSize using a transform matrix secTransMatrix[ ][ ], and derives a coefficient v[ ] of a one-dimensional array having a length of nStOutSize as an output. The feature lies in that the value of the position v[0] of DC is not changed (v[0]=u[0]).

$$v[i] = u[i](i == 0)$$

$$v[i] = \text{Clip3}$$

$$(\text{CoeffMin}, \text{CoeffMax}, \Sigma(seeTransMatrix[i][j] * u[j]) + 64) \gg 7)(i != 0)$$

Here, Σ is the sum up to j=1, . . . , nonZeroSize−1. i performs processing on 1, . . . , nStSize−1. The following may be employed (i=0, . . . , nStSize−2 and j=0, . . . , nonZeroSize−2).

$v[i + 1] =$ Clip3

$(CoeffMin, CoeffMax, \Sigma(secTransMatrix[i][j] * u[j + 1] + 64) >> 7)(i != 0)$ Although the above has described a configuration of not changing the value of DC by performing operation at the position (i==0) of DC different from that at other positions, a matrix secTransMatrixDC that does not change a value of DC may be used.

Configuration 3 of Non-Separable Transform except DC Component

Figure 18:
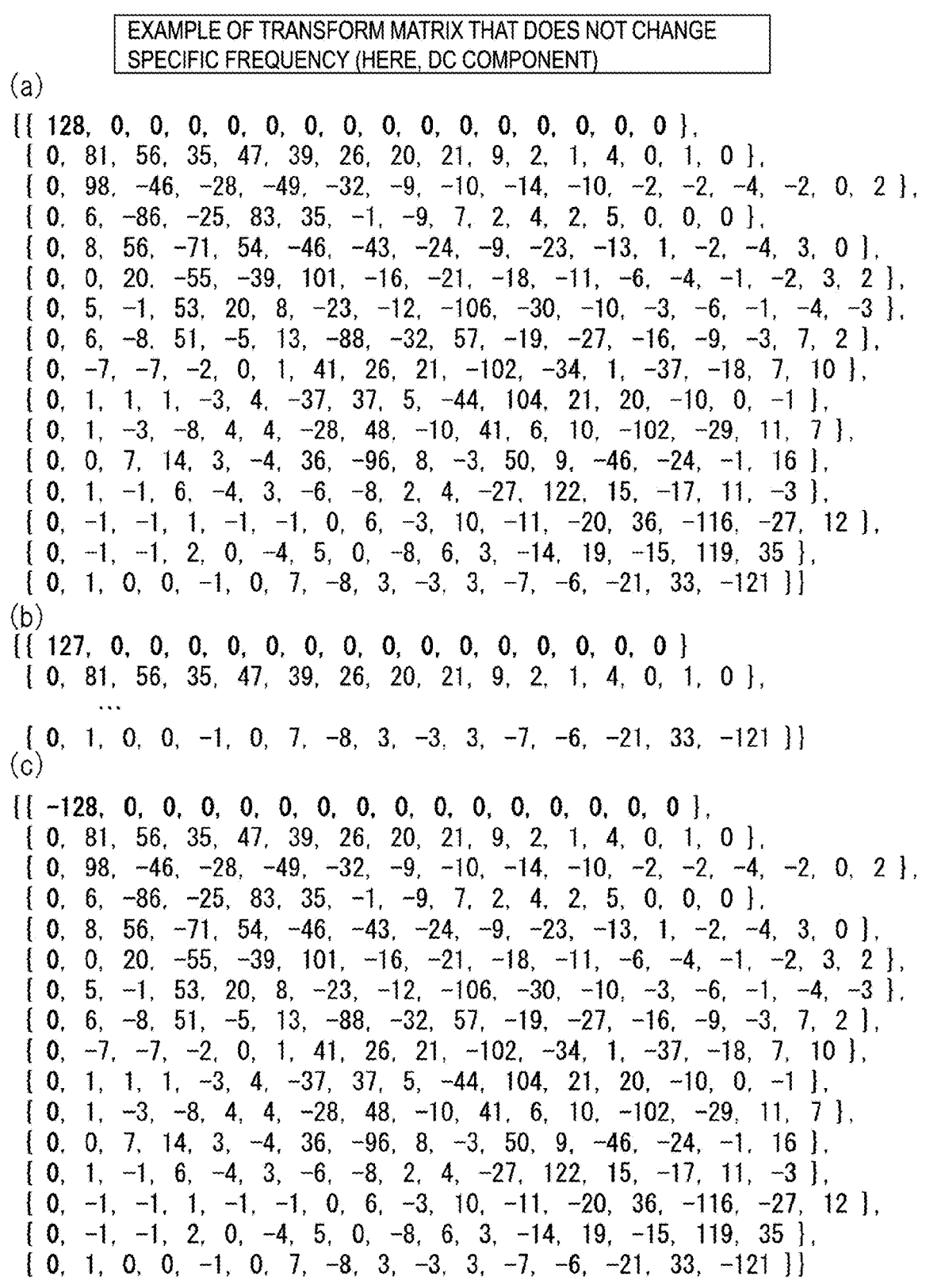

FIG. 18 is a diagram illustrating transform of storing DC transform. As illustrated in the figure, the inverse non-separable transform processing unit 31121 uses secTransMatrixDC having prescribed characteristics as the matrix used in S2203 among S2201 to S2204 described above, and thereby performs the inverse non-separable transform of storing the DC value.

Specifically, as illustrated in (a) in the figure, secTransMatrixDC is a transform matrix in which the value of a top left component is set equal to 1<<shiftVal (for example, shiftVal=7), a component in a top edge column is set equal to 0, and a component in a left edge column is set equal to 0. By using secTransMatrixDC, in the transform and inverse transform of the non-separable transform, Identical transform can be applied to a first (DC) component in an input vector.

$secTransMatrixDC[0][0] = 1 << shiftVal$ $secTransMatrixDC[i][0] = 0 \ (i = 0, \ldots, nStSize - 1)$ $secTransMatrixDC[0][j] = 0 \ (j = 0, \ldots, nonZeroSize - 1)$ Here, a product of the transposition matrixes of secTransMatrixDC and secTransMatrixDC may be an integer multiple (1<<(shiftVal+1)) of a unit matrix.

Alternatively, as illustrated in (b) in the figure, secTransMatrixDC is a transform matrix in which a top left is set equal to (1<<shiftVal)−1 (for example, shiftVal=7), a top edge column is set equal to 0, and a left edge column is set equal to 0. By using secTransMatrixDC, in the transform and inverse transform of the non-separable transform, Identical transform can be applied to a first (DC) component in an input vector.

$secTransMatrixDC[0][0] = (1 << shiftVal) - 1$ $secTransMatrixDC[i][0] = 0 \ (i = 0, \ldots, nStSize - 1)$ $secTransMatrixDC[0][j] = 0 \ (j = 0, \ldots, nonZeroSize - 1)$ Usually, a signed variable uses a range such as from −128 to 127 (from −2^shiftVal to 2^shiftVal−1), and thus by using the value (for example, 127) of (1<<shiftVal)−1 as described above, the range of a 1-bit value can be reduced, and a load of multiplication processing can be reduced.

As illustrated in (c) in the figure, the value (for example, −128) of −(1<<shiftVal) may be used. In this case, the sign is inverted as in v[0]=−u[0] in the DC value before and after the processing of the non-separable transform and the inverse non-separable transform; however, there is no problem because a coefficient whose sign is inverted in the coding apparatus has the sign inverted again to become the same value in the decoding apparatus.

$secTransMatrixDC[0][0] = -(1 << shiftVal)$ $secTransMatrixDC[i][0] = 0 \ (i = 0, \ldots, nStSize - 1)$ $secTransMatrixDC[0][j] = 0 \ (j = 0, \ldots, nonZeroSize - 1)$ In this case as well, the range of a 1-bit value can be reduced, and a load of multiplication processing can be reduced.

Details of Non-Separable Transform Processing

Example of Performing LFNST Transform in CIIP Mode

In the following, in an example of performing LFNST transform in the CIIP mode (or the GPM mode using the intra prediction image), a method of deriving lfnstTrSetId for defining the transform matrix of the non-separable transform will be described.

Figure 19:
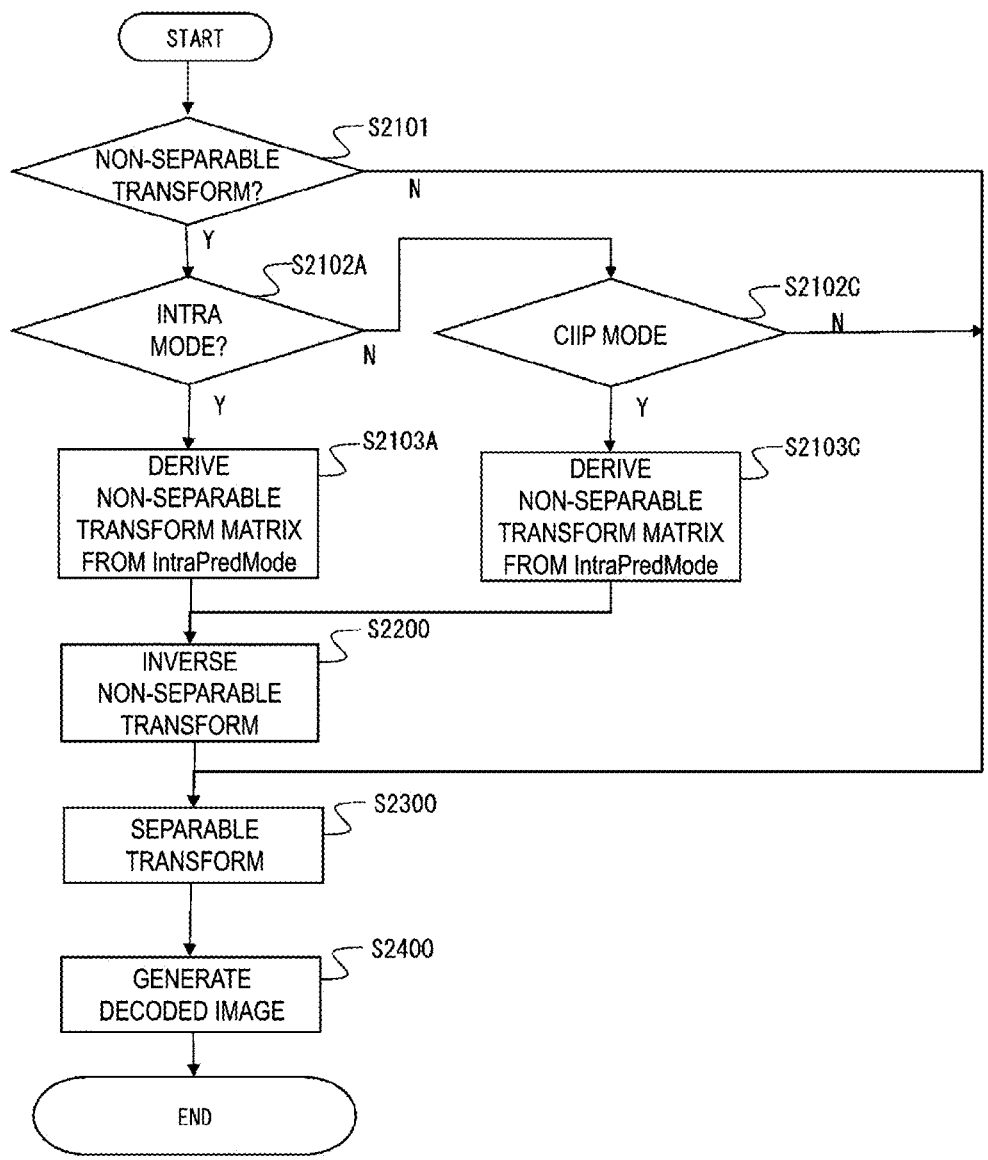
FIG. 19 is a flowchart of processing of performing LFNST in a CIP mode.

FIG. 19 illustrates a flowchart of processing of performing LFNST in the CIP mode.

(S2101) In a case of performing the non-separable transform (ApplyLfnstFlag !=0), the processing proceeds to S2102A. ApplyLfnstFlag is a flag indicating whether to perform LFNST. In a case that ApplyLfnstFlag is 1 (greater than 0, or other than 0), LFNST (non-separable transform) is performed, otherwise the non-separable transform is skipped, the processing proceeds to S2300, and the separable transform is performed. Note that, in a case that the non-separable transform is applied only to luminance, for example, whether the non-separable transform is performed may be determined using ApplyLfnstFlag.

```
if (treeType == SINGLE_TREE or DUAL_TREE_LUMA)
    ApplyLfnstFlag[0] = (lfnst_idx > 0) ? 1 : 0
else
    ApplyLfnstFlag[cIdx] = (lfnst_idx > 0 && treeType ==
DUAL_TREE_CHROMA) ? 1 : 0
Here, treeType is one of SINGLE_TREE, DUAL_TREE_LUMA, and
DUAL_TREE_CHROMA, and cIdx is a variable of 0 for luminance and 1 or 2 for chrominance.
```

(S2102A) In a case of the intra prediction mode, the processing proceeds to S2103A.

(S2103A) In a case of the intra prediction mode, lfnstTrSetId is derived from IntraPredMode. The transform matrix secTransMatrix[ ][ ] is derived from lfnstTrSetId, the block size, and lfnst_idx.

(S2102C) In a case that it is not the intra prediction mode, the processing proceeds to S2102C, and determination (ciip_flag !=0) as to whether it is the CIP mode is performed. The determination may be determination as to whether it is the CIP mode or it is the GPM mode using the intra prediction. In a case that it is not the CIP mode (or not the GPM mode using the intra prediction), the non-separable transform is skipped, the processing proceeds to S2300, and the separable transform is performed.

(S2103C) lfnstTrSetId is derived from IntraPredMode. The transform matrix secTransMatrix[ ][ ] is derived from lfnstTrSetId, the block size, and lfnst_idx. In a case of the CIP mode or the GPM mode using the intra prediction, IntraPredMode is used for derivation of the intra prediction image.

(S2200) The inverse non-separable transform processing unit 31121 performs the non-separable transform, using the transform matrix secTransMatrix[ ][ ]. Specifically, the processing from S2201 to S2204 described above may be performed. In the non-separable transform of the intra prediction and the non-separable transform of the inter prediction (the CIP mode or the GPM mode), different transform matrices may be used. In the non-separable transform in the CIP mode or the GPM mode, the non-separable transform (configuration 1, configuration 2, and configuration 3 described above) of excluding or storing the DC component may be used.

(S2300) The inverse separable transform processing unit 31123 performs the separable transform on transform coefficient subjected to the non-separable transform or the transform coefficient not subjected to the non-separable transform.

According to the configuration described above, the non-separable transform is also performed in the CIP mode in which a prediction image close to the intra prediction is generated, and therefore there is an effect of enhancing coding efficiency. In addition, in a case that the prediction mode is the CIP mode or the GPM mode using the intra prediction, not only the CIP mode, the non-separable transform may be performed. Whether the prediction mode is the CIP mode or the GPM mode using the intra prediction may be determined by the following generalizedIntraInter.

*generalizedIntraInter* =

$\quad$ ciip_flag[x0][y0]||merge_gpm_intra_flag0||merge_gpm_intra_flag1

Alternatively, derivation may be performed as follows.

*generalizedIntraInter* = ciip_flag[x0][y0]||merge_gpm_intra_flag

Figure 20:
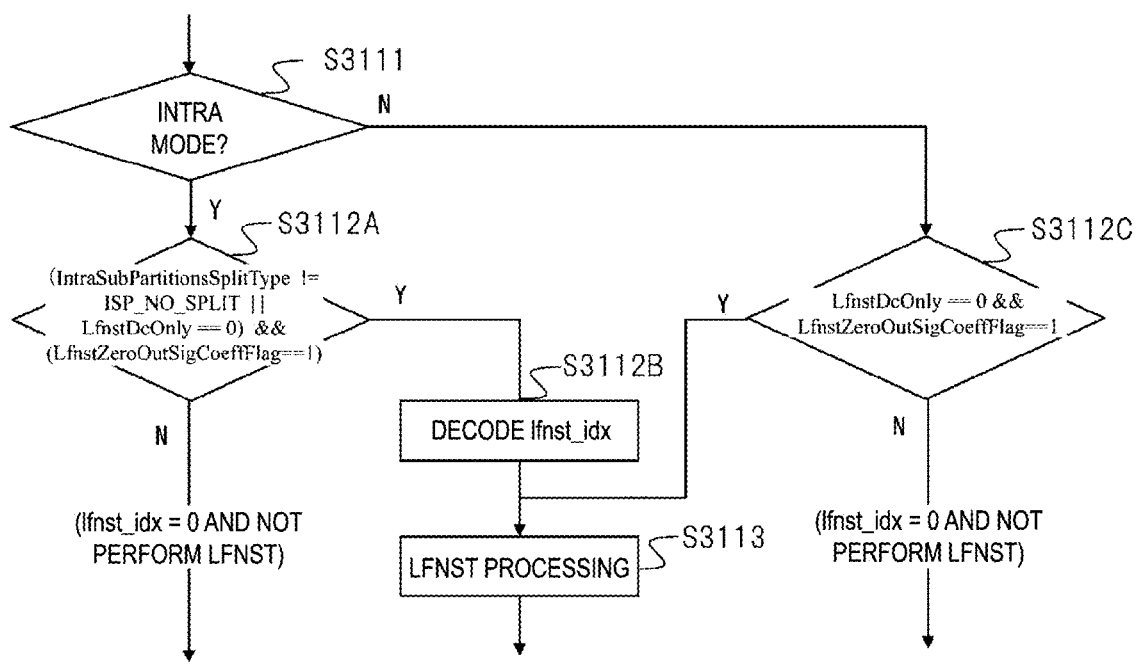
FIG. 20 is a flowchart illustrating a configuration of performing LFNST processing in a case that a target block is subjected to inter prediction (CuPredMode !=MODE_INTRA).

In a case of the inter prediction, the non-separable transform processing may be invariably performed, without decoding lfnst_idx. FIG. 20 is a flowchart illustrating a configuration of performing the LFNST processing in a case that the target block is subjected to the inter prediction (CuPredMode !=MODE_INTRA).

(S3111) Whether the prediction mode is the intra mode is determined. In a case of YES (the prediction mode is the intra mode), the processing proceeds to S3112A. In a case of NO (the prediction mode is the inter mode), the processing proceeds to S3112C. For determination of the intra mode, CuPredMode !=MODE_INTRA may be used for the determination, or CuPredMode=MODE_INTER may be used for the determination.

(S3112A) In a case that the prediction mode is intra, whether the number of non-zero transform coefficients is not small (for example, the flag LfnstDcOnly==0; which is a flag indicating only the DC coefficient) and whether the values of the transform coefficients in a prescribed high frequency region are all 0 (LfnstZeroOutSigCoeffFlag==1) are determined. In a case that the determination is YES, the processing proceeds to S31131B.

(S3112B) In a case that the prediction mode is the intra mode and the non-separable transform is performed, lfnst_idx is decoded from the coded data.

(S3112C) In a case that the prediction mode is the inter mode, whether the number of non-zero transform coefficients is not small (for example, the flag LfnstDcOnly=0; which is a flag indicating only the DC coefficient) and whether the values of the transform coefficients in a prescribed high frequency region are all 0 (LfnstZeroOutSigCoeffFlag==1) are determined. In a case that the determination is YES, the processing proceeds to S3113. In this case, a non-zero value is inferred as lfnst_idx.

(S3113) The inverse non-separable transform processing unit 31121 performs the non-separable transform. A method of deriving the transform matrix used in the non-separable transform will be separately described.

Note that, although in (53112C), in a case of the inter prediction, the value of lfnst_idx is derived without being derived from the coded data, ApplyLfnstFlag may be set equal to TRUE as follows.

*ApplyLfnstFlag* =

$\quad$ (*lfnstDcOnly* == 0 && *LfnstZeroOutSigCoeffFlag* == 1) ? 1:0

Here, LfnstZeroOutSigCoeffFlag is a flag indicating whether there is a non-zero transform coefficient in the zero-out region, and in a case of TRUE, it indicates that there is no non-zero coefficient in the zero-out region.

In addition, lfnst_idx may also be decoded in the inter prediction, and LFNST may be performed in a case that lfnst_idx>0. In this case, derivation is performed as follows.

*ApplyLfnstFlag* = (*lfnstDcOnly* == 0 &&

$\quad$ *LfnstZeroOutSigCoeffFlag* == 1 && lfnst_idx > 0) ? 1:0

With the case of the intra prediction being taken into consideration as well, ApplyLfnstFlag may be derived as follows.

*ApplyLfnstFlag* =

$\quad$ (*lfnstDcOnly* == 0 && *LfnstZeroOutSigCoeffFlag* == 1) &&

$\quad\quad$ (*CuPredMode* !=

$\quad$ MODE_INTER||(*CuPredMode* != MODE_INTRA && lfnst_idx > 0))? 1:0

Note that, in a case that lfnst_idx is not present in the coded data, lfnst_idx may be inferred as 0.

In addition, in a case that lfnst_idx>0, LFNST may be invariably performed, and ApplyLfnstFlag may be derived as follows.

*ApplyLfnstFlag* =

$\quad$ (*CuPredMode* == MODE_INTER && *LfnstZeroOutSigCoeffFlag* ==

$\quad\quad$ 1 && *lfnstDcOnly* == 0)||(lfnst_idx > 0))?1:0

-continued

Note that *CuPredMode* == MODE_INTER in *ApplyLfnstFlag* =

(*CuPredMode* == MODE_INTER &&

*LfnstZeroOutSigCoeffFlag* == 1 && *lfnstDcOnly* == 0)||lfnst_idx > 0)

above may be *CuPredMode* != MODE_INTRA.

Figure 21:
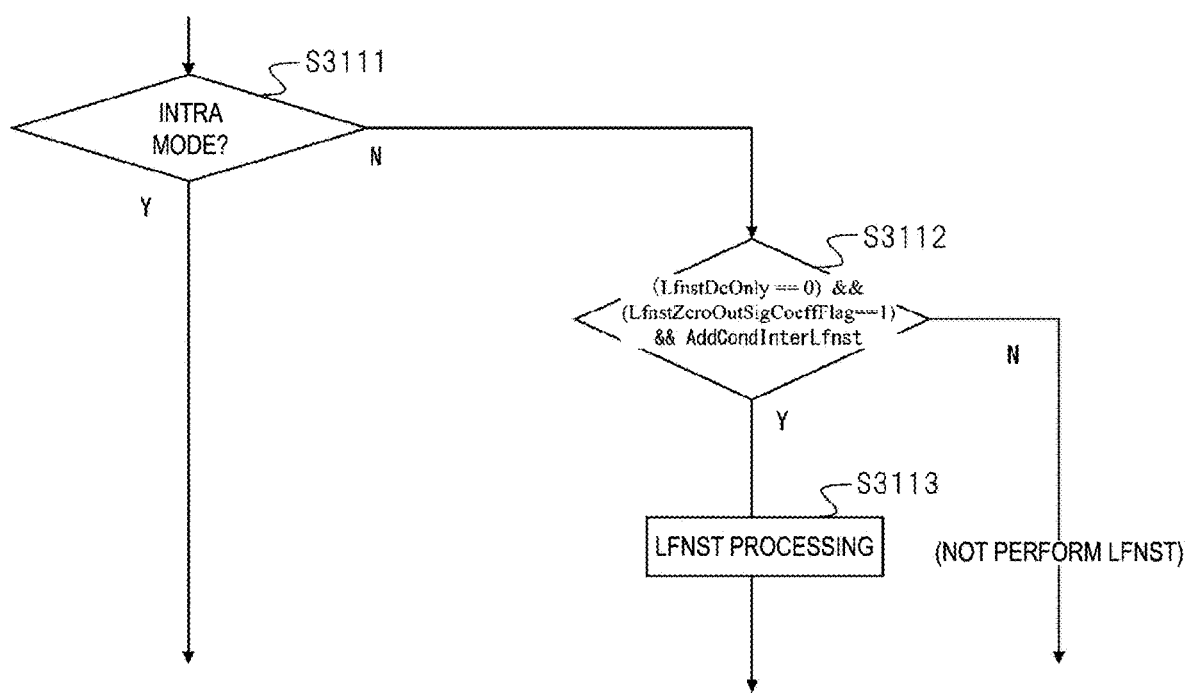
FIG. 21 is a flowchart illustrating a configuration of performing LFNST processing in a case that a target block is subjected to inter prediction (CuPredMode !=MODE_INTRA).

FIG. 21 is a flowchart illustrating a configuration of performing the LFNST processing in a case that the target block is subjected to the inter prediction (CuPredMode !=MODE_INTRA).

(S3111) Whether the prediction mode is the intra mode is determined. In a case of NO (the prediction mode is the inter mode), the processing proceeds to S3112. For determination of the intra mode, CuPredMode !=MODE_INTRA and CuPredMode=MODE_INTER may be used for the determination.

(S3112) In a case that the prediction mode is the inter mode, whether the number of non-zero transform coefficients is not small (for example, the flag LfnstDcOnly==0; which is a flag indicating only the DC coefficient) and whether the values of the transform coefficients in a prescribed high frequency region are all 0 (LfnstZeroOutSigCoeffFlag==1) are determined. In a case that the determination is YES, the processing proceeds to S3113. Otherwise, the LFNST processing is not performed. For determination of (S3112), (LfnstDcOnly==0) && (LfnstZeroOutSigCoeffFlag==1) && AddCondlnterLfnst may be used. AddCondlnterLfnst is a flag indicating whether the block size of the target block is within a prescribed range, it is luminance, or the like. LfnstDcOnly is a flag indicating that only the DC coefficient is included.

(S3113) The inverse non-separable transform processing unit 31121 performs the non-separable transform. A method of deriving the transform matrix used in the non-separable transform will be separately described.

According to the configuration described above, LFNST is not performed in a case that the prediction mode is the inter mode and the transform coefficient is only DC. Thus, by applying the LFNST transform to the DC coefficient, transform coefficients already concentrated at one coefficient position (DC) can be distributed, and a waste that causes unnecessary frequency limitation can be reduced.

Note that the CU decoder 3022 and a CU coder 1112 may derive ApplyLfnstFlag using the following condition expression, and determine whether to perform LFNST using ApplyLfnstFlag.

*ApplyLfnstFlag* =

(*CuPredMode* == MODE_INTER && *LfnstDcOnly* == 0 &&

*LfnstZeroOutSigCoeffFlag* == 1)||(lfnst_idx > 0))? 1:0

As described below, as processing of a case that lfnst_idx is not present in the coded data, lfnst_idx may be derived, and ApplyLfnstFlag may be derived from lfnst_idx. In a case that lfnst_idx is not present in the coded data, lfnst_idx is derived as follows.

lfnst_idx = (*CuPredMode* == MODE_INTER &&

-continued

*LfnstDcOnly* == 0 && *LfnstZeroOutSigCoeffFlag* == 1)? 1:0

Configuration 2 of Performing Non-Separable Transform Depending on Zeroing Out, Configuration of GPM Prediction In a case of the GPM prediction, a configuration of invariably performing the non-separable transform processing without decoding lfnst_idx will be described. In the configuration, in a case that the transform coefficient is zeroed out in the GPM prediction, ApplyLfnstFlag is set equal to TRUE.

*ApplyLfnstFlag* =

((*MergeGpmFlag* == 1 && *LfnstZeroOutSigCoeffFlag* == 1)

||(*CuPredMode* != MODE_INTRA && lfnst_idx > 0)))? 1:0

Derivation may be performed as follows.

*ApplyLfnstFlag* =

((*MergeGpmFlag* == 1 && *LfnstZeroOutSigCoeffFlag* == 1)

||lfnst_idx > 0))? 1:0

In a case that ApplyLfnstFlag is other than 0, the inverse non-separable transform processing unit performs the inverse non-separable transform.

The addition unit 312 adds the prediction image of the block input from the prediction image generator 308 and the prediction error input from the inverse quantization and inverse transform processing unit 311 for each pixel, and generates a decoded image of the block. The addition unit 312 stores the decoded image of the block in the reference picture memory 306, and also outputs it to the loop filter 305.

Configuration of Video Coding Apparatus

Figure 22:
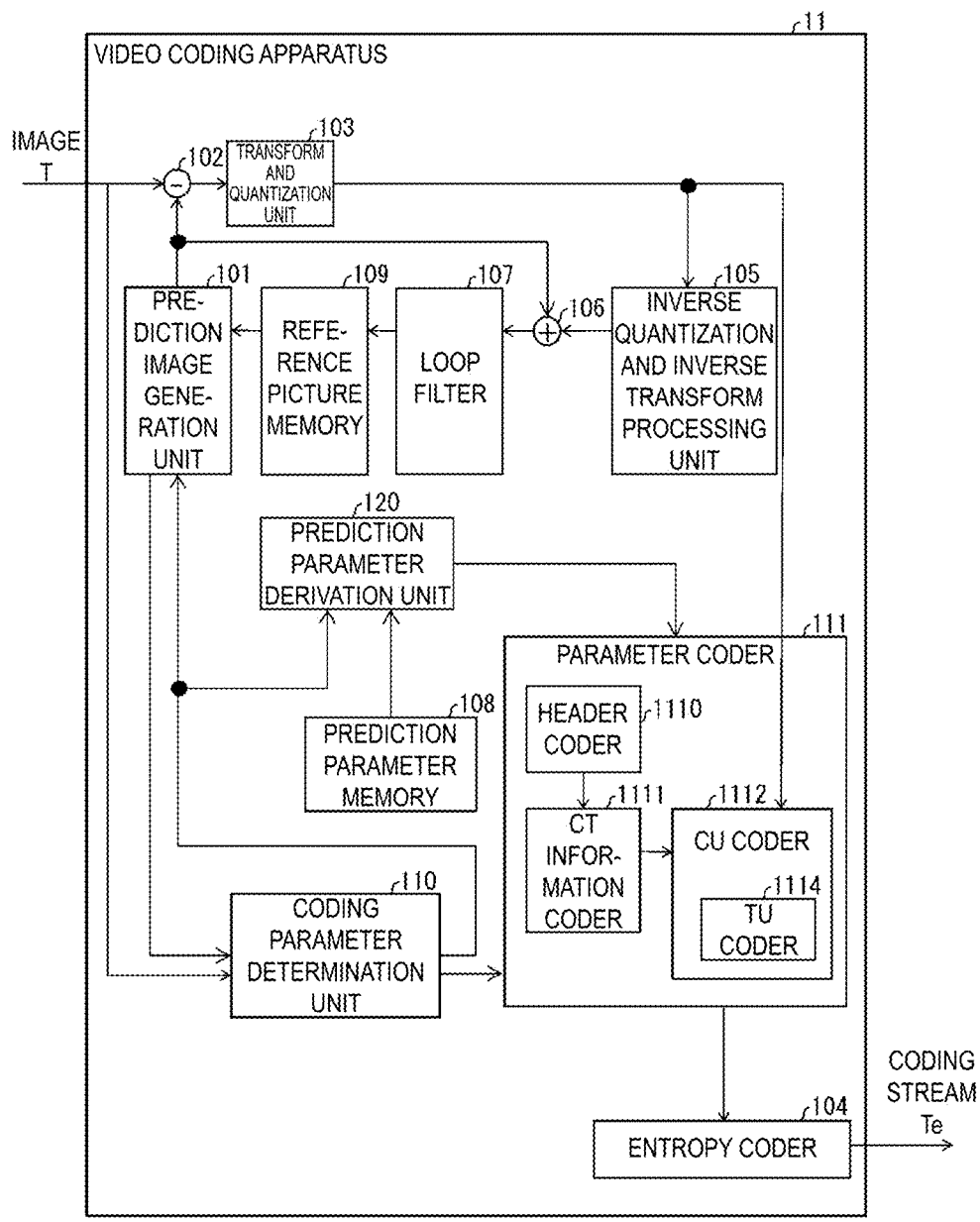
FIG. 22 is a block diagram illustrating a configuration of a video coding apparatus.

Next, a configuration of the video coding apparatus 11 according to the present embodiment will be described. FIG. 22 is a block diagram illustrating a configuration of the video coding apparatus 11 according to the present embodiment. The video coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit or a frame memory) 108, a reference picture memory (a reference image storage unit or a frame memory) 109, a coding parameter determination unit 110, a parameter coder 111, a prediction parameter derivation unit 120, and an entropy coder 104.

The prediction image generation unit 101 generates a prediction image for each CU. The prediction image generation unit 101 includes the inter prediction image generation unit 309 and intra prediction image generation unit already described, and description of these units is omitted.

The subtraction unit 102 subtracts a pixel value of the prediction image of a block input from the prediction image generation unit 101 from a pixel value of an image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantized transform coefficient by quantization. The transform and quantization unit 103 outputs the quantized transform coefficient to the parameter coder 111 and the inverse quantization and inverse transform processing unit 105.

The transform and quantization unit 103 includes a separable transform processing unit (first transform processing unit), a non-separable transform processing unit (second transform processing unit), and a scaling unit.

The separable transform processing unit applies the separable transform to a prediction error. In a case that lfnst_idx is not 0, the non-separable transform processing unit performs the non-separable transform. The scaling unit performs scaling for a transform coefficient using a quantization matrix.

Specifically, the transform and quantization unit 103 performs the following processing.

S1: The separable transform processing unit performs the separable transform.

S2: The non-separable transform processing unit determines whether the non-separable transform is enabled (lfnst_idx !=0).

S3: In a case that the non-separable transform is enabled, the non-separable transform processing unit performs the non-separable transform (forward non-separable transform).

S3B: In a case that the non-separable transform is not enabled, the non-separable transform processing unit does not perform the non-separable transform (forward non-separable transform).

S4: The scaling unit performs scaling for a transform coefficient using a quantization matrix.

In the (forward) non-separable transform, processing substantially equivalent to the inverse non-separable transform is performed.

The inverse quantization and inverse transform processing unit 105 is the same as the inverse quantization and inverse transform processing unit 311 of the video decoding apparatus 31, and descriptions thereof are omitted. The calculated prediction error is output to the addition unit 106.

The parameter coder 111 includes a header coder 1110, a CT information coder 1111, and a CU coder 1112 (prediction mode coder). The CU coder 1112 further includes a TU coder 1114. General operation of each module will be described below.

The header coder 1110 performs coding processing of parameters such as header information, split information, prediction information, and quantized transform coefficients.

The CT information coder 1111 codes the QT and MT (BT, TT) split information and the like.

The CU coder 1112 codes the CU information, the prediction information, the split information, and the like.

In a case that a prediction error is included in the TU, the TU coder 1114 codes the QP update information and the quantization prediction error.

The CT information coder 1111 and the CU coder 1112 supplies, to the parameter coder 111, syntax elements such as the inter prediction parameters (predMode, merge flag, merge idx, inter_pred_idc, refIdxLX, mvp_LX_idx, and mvdLX), the intra prediction parameters, and the quantized transform coefficients.

The parameter coder 111 inputs the quantized transform coefficients and the coding parameters (split information and prediction parameters) to the entropy coder 104. The entropy coder 104 entropy-codes the quantized transform coefficients and the coding parameters to generate and output a coding stream Te.

The prediction parameter derivation unit 120 is a means including the inter prediction parameter coder 112 and the intra prediction parameter coder, and derives an intra prediction parameter and an intra prediction parameter from the parameters input from the coding parameter determination unit 110. The derived intra prediction parameter and intra prediction parameter are output to the parameter coder 111.

Configuration of Inter Prediction Parameter Coder

Figure 23:
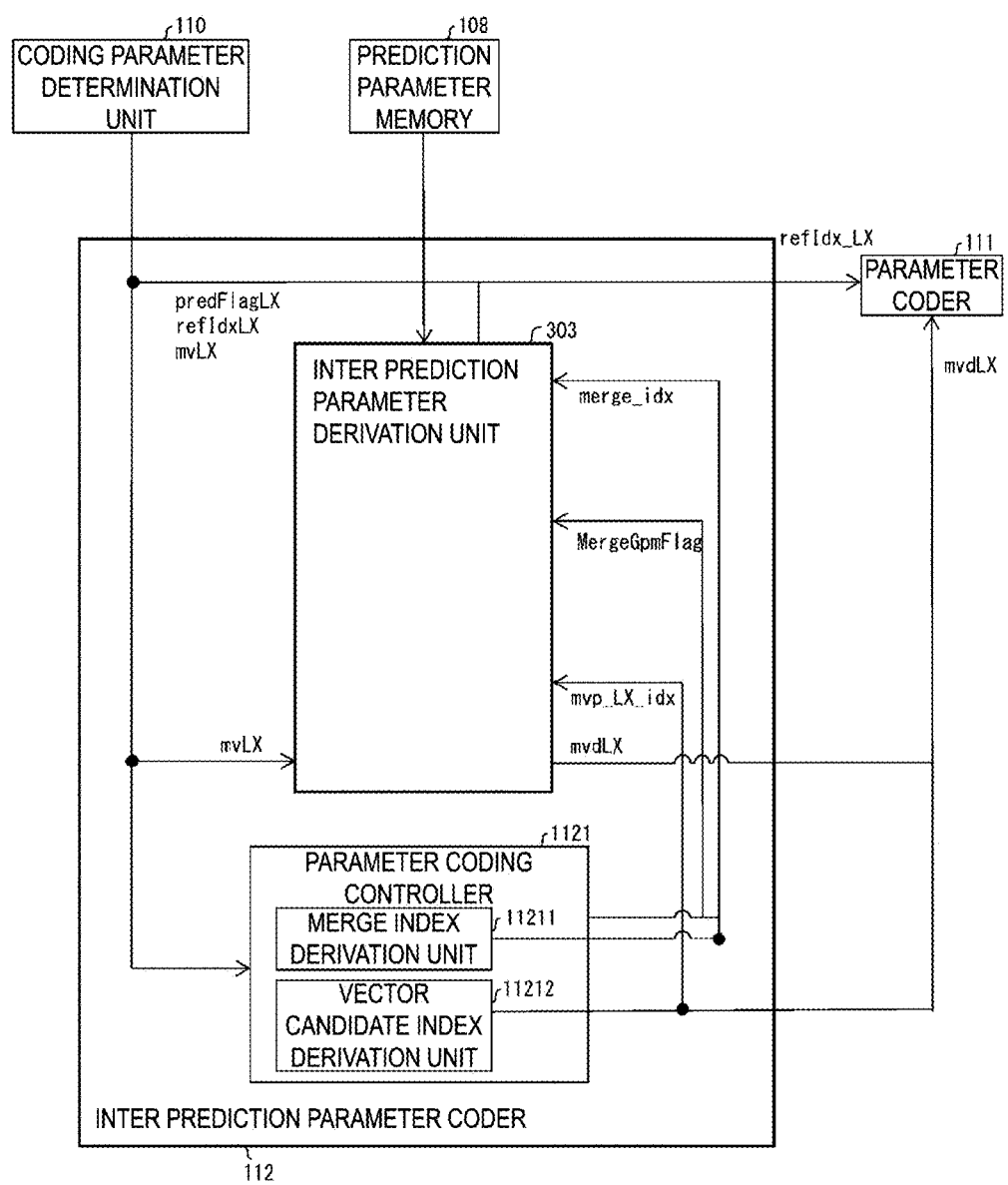
FIG. 23 is a schematic diagram illustrating a configuration of an inter prediction parameter coder.

As illustrated in FIG. 23, the inter prediction parameter coder 112 includes a parameter coding controller 1121 and an inter prediction parameter derivation unit 303. The inter prediction parameter derivation unit 303 has a configuration common to the video decoding apparatus. The parameter coding controller 1121 includes a merge index derivation unit 11211 and a vector candidate index derivation unit 11212.

The merge index derivation unit 11211 derives merge candidates and the like, and outputs the merge candidates and the like to the inter prediction parameter derivation unit 303. The vector candidate index derivation unit 11212 derives prediction vector candidates and the like, and outputs the prediction vector candidates and the like to the inter prediction parameter derivation unit 303 and the parameter coder 111.

Configuration of Intra Prediction Parameter Coder

The intra prediction parameter coder includes a parameter coding controller and an intra prediction parameter derivation unit. The intra prediction parameter derivation unit has a configuration common to the video decoding apparatus.

However, unlike in the video decoding apparatus, the coding parameter determination unit 110 and the prediction parameter memory 108 provide input to the inter prediction parameter derivation unit 303 and the intra prediction parameter derivation unit, and the input is output to the parameter coder 111.

The addition unit 106 adds, for each pixel, the pixel value for the prediction block input from the prediction image generation unit 101 and the prediction error input from the inverse quantization and inverse transform processing unit 105 to generate a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may include only a deblocking filter, for example.

The prediction parameter memory 108 stores the prediction parameters generated by the coding parameter determination unit 110 at a predetermined position for each target picture and CU.

The reference picture memory 109 stores the decoded image generated by the loop filter 107 at a predetermined position for each target picture and CU.

The coding parameter determination unit 110 selects one set among multiple sets of coding parameters. The coding parameters include QT, BT, or TT split information described above, a prediction parameter, or a parameter to be coded which is generated in relation to the aforementioned elements. The prediction image generation unit 101 generates a prediction image by using these coding parameters.

The coding parameter determination unit 110 calculates an RD cost value indicating the magnitude of an amount of information and a coding error for each of the multiple sets.

The RD cost value is, for example, the sum of an amount of code and the value obtained by multiplying a square error by a coefficient X. The code amount is an amount of information of the coding stream Te obtained by performing entropy coding on a quantization error and a coding parameter. The square error is the square sum of prediction errors calculated by the subtraction unit 102. The coefficient X is a real number greater than a preset zero. The coding parameter determination unit 110 selects a set of coding parameters of which the calculated cost value is a minimum value. The coding parameter determination unit 110 outputs the determined coding parameters to the parameter coder 111 and the prediction parameter derivation unit 120.

Note that a computer may be used to implement some of the video coding apparatus 11 and the video decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction parameter derivation unit 320, the prediction image generation unit 101, the subtraction unit 102, the transform and quantization unit 103, the entropy coder 104, the inverse quantization and inverse transform processing unit 105, the loop filter 107, the coding parameter determination unit 110, a parameter coder 111, and the prediction parameter derivation unit 120. In that case, this configuration may be realized by recording a program for realizing such control functions on a computer-readable recording medium and causing a computer system to read and perform the program recorded on the recording medium. Note that the "computer system" described here refers to a computer system built into either the video coding apparatus 11 or the video decoding apparatus 31 and is assumed to include an OS and hardware components such as a peripheral apparatus. In addition, the "computer-readable recording medium" refers to a portable medium such as a flexible disk, a magneto-optical disk, a ROM, and a CD-ROM, and a storage apparatus such as a hard disk built into the computer system. Moreover, the "computer-readable recording medium" may include a medium that dynamically stores a program for a short period of time, such as a communication line in a case that the program is transmitted over a network such as the Internet or over a communication line such as a telephone line, and may also include a medium that stores the program for a certain period of time, such as a volatile memory included in the computer system functioning as a server or a client in such a case. In addition, the above-described program may be one for implementing some of the above-described functions, and also may be one capable of implementing the above-described functions in combination with a program already recorded in a computer system.

A part or all of the video coding apparatus 11 and the video decoding apparatus 31 in the embodiment described above may be realized as an integrated circuit such as a Large Scale Integration (LSI). Each function block of the video coding apparatus 11 and the video decoding apparatus 31 may be individually realized as processors, or part or all may be integrated into processors. In addition, the circuit integration technique is not limited to LSI, and implementation as a dedicated circuit or a multi-purpose processor may be adopted. In addition, in a case that a circuit integration technology that replaces LSI appears as the semiconductor technologies advance, an integrated circuit based on that technology may be used.

Although embodiments of the present invention have been described above in detail with reference to the drawings, the specific configurations thereof are not limited to those described above and various design changes or the like can be made without departing from the spirit of the invention.

An embodiment of the present invention is not limited to the embodiments described above and various changes can be made within the scope indicated by the claims. That is, embodiments obtained by combining technical means appropriately modified within the scope indicated by the claims are also included in the technical scope of the present invention.

INDUSTRIAL APPLICABILITY

The embodiments of the present invention can be preferably applied to a video decoding apparatus for decoding coded data in which image data is coded, and a video coding apparatus for generating coded data in which image data is coded. In addition, the embodiments of the present invention can be preferably applied to a data structure of coded data generated by the video coding apparatus and referred to by the video decoding apparatus.

The invention claimed is:
1. A video decoding apparatus comprising:
a prediction image generation circuit configured to generate a prediction image; and
an inverse non-separable transform processing circuit configured to perform an inverse non-separable transform, wherein
the inverse non-separable transform processing circuit does not change a direct current (DC) component that is a top left component of a transform coefficient.
2. The video decoding apparatus according to claim 1, wherein
the inverse non-separable transform processing circuit does not change the DC component in a case of inter prediction.
3. The video decoding apparatus according to claim 1, wherein
the inverse non-separable transform processing circuit derives a one-dimensional array excluding the DC component, and performs a transform of the one-dimensional array.
4. The video decoding apparatus according to claim 1, wherein
the inverse non-separable transform processing circuit uses a transform matrix in which a left edge component and a top edge component, except the top left component, are zeros.

* * * * *